(12) United States Patent
Ichihara

(10) Patent No.: US 10,585,334 B2
(45) Date of Patent: Mar. 10, 2020

(54) ILLUMINATION APPARATUS AND CAMERA SYSTEM HAVING THE SAME

(71) Applicant: CANON KABUSHIKI KAISHA, Tokyo (JP)

(72) Inventor: Yoshiro Ichihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/256,169

(22) Filed: Jan. 24, 2019

(65) Prior Publication Data

US 2019/0235352 A1    Aug. 1, 2019

(30) Foreign Application Priority Data

Jan. 29, 2018    (JP) .................. 2018-013092

(51) Int. Cl.
    *G03B 15/06* (2006.01)
    *G03B 15/05* (2006.01)
(52) U.S. Cl.
    CPC .......... *G03B 15/06* (2013.01); *G03B 15/05* (2013.01); *G03B 2215/0578* (2013.01); *G03B 2215/0585* (2013.01)

(58) Field of Classification Search
None
See application file for complete search history.

(56) References Cited

U.S. PATENT DOCUMENTS

| 2017/0257541 A1* | 9/2017 | Saito | G03B 15/05 |
| 2017/0351160 A1* | 12/2017 | Ichihara | G03B 7/16 |
| 2019/0235353 A1* | 8/2019 | Hsu | F16B 21/086 |

FOREIGN PATENT DOCUMENTS

JP    01-147530 A    6/1989

* cited by examiner

*Primary Examiner* — William B Perkey
(74) *Attorney, Agent, or Firm* — Cowan, Liebowitz & Latman, P.C.

(57) ABSTRACT

An illumination apparatus includes a light source portion including a light emitter and a reflector configured to reflect light from the light emitter, a mover configured to move at least one of the light emitter and the reflector so that a relative distance between the light emitter and the reflector varies in order to change a light distribution angle of the light source portion, and a controller configured to control a position of at least one of the light emitter and the reflector via the mover based on a light emission amount of the light emitter.

11 Claims, 16 Drawing Sheets

PRIOR ART

WIDE

MID

TELE

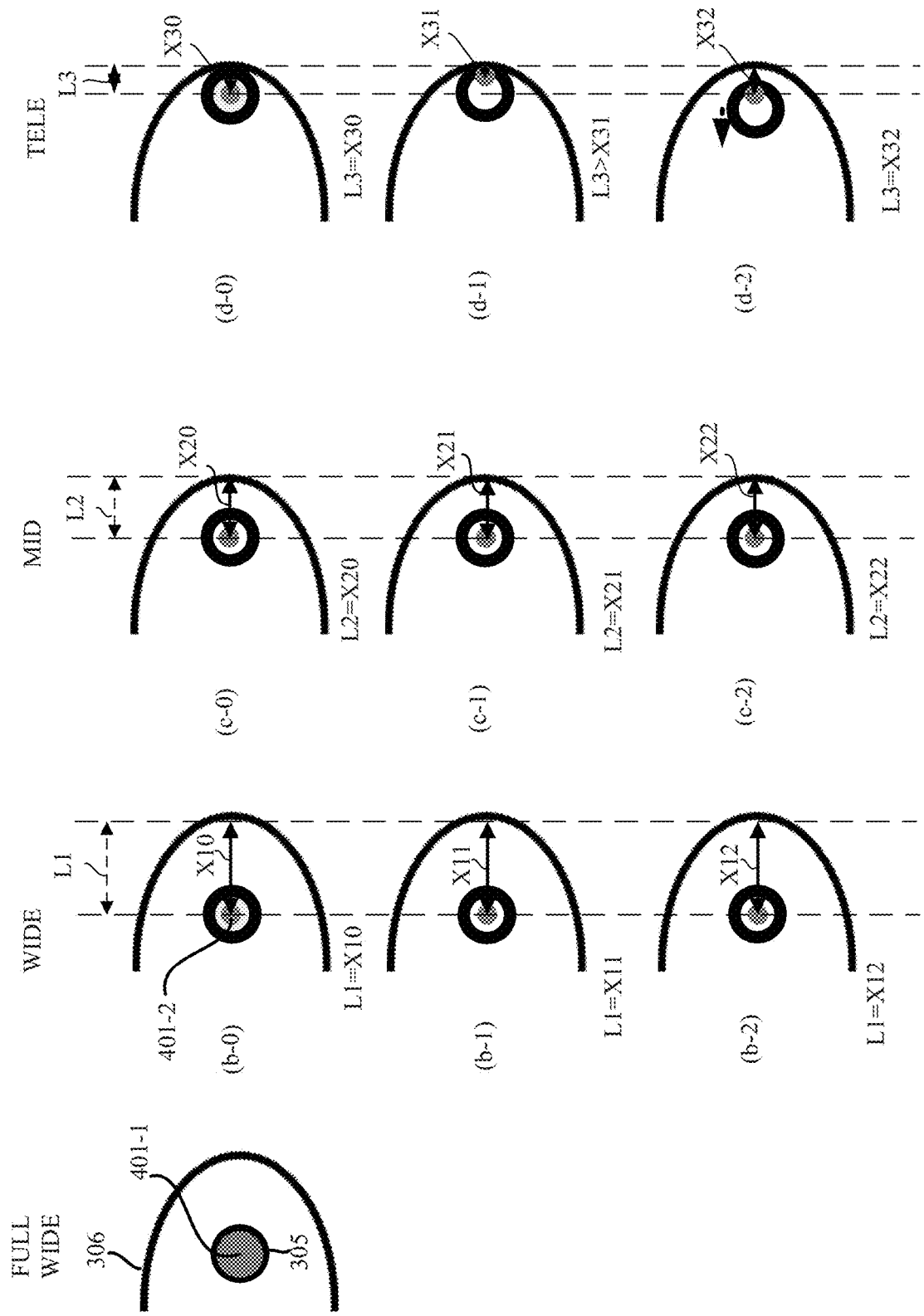

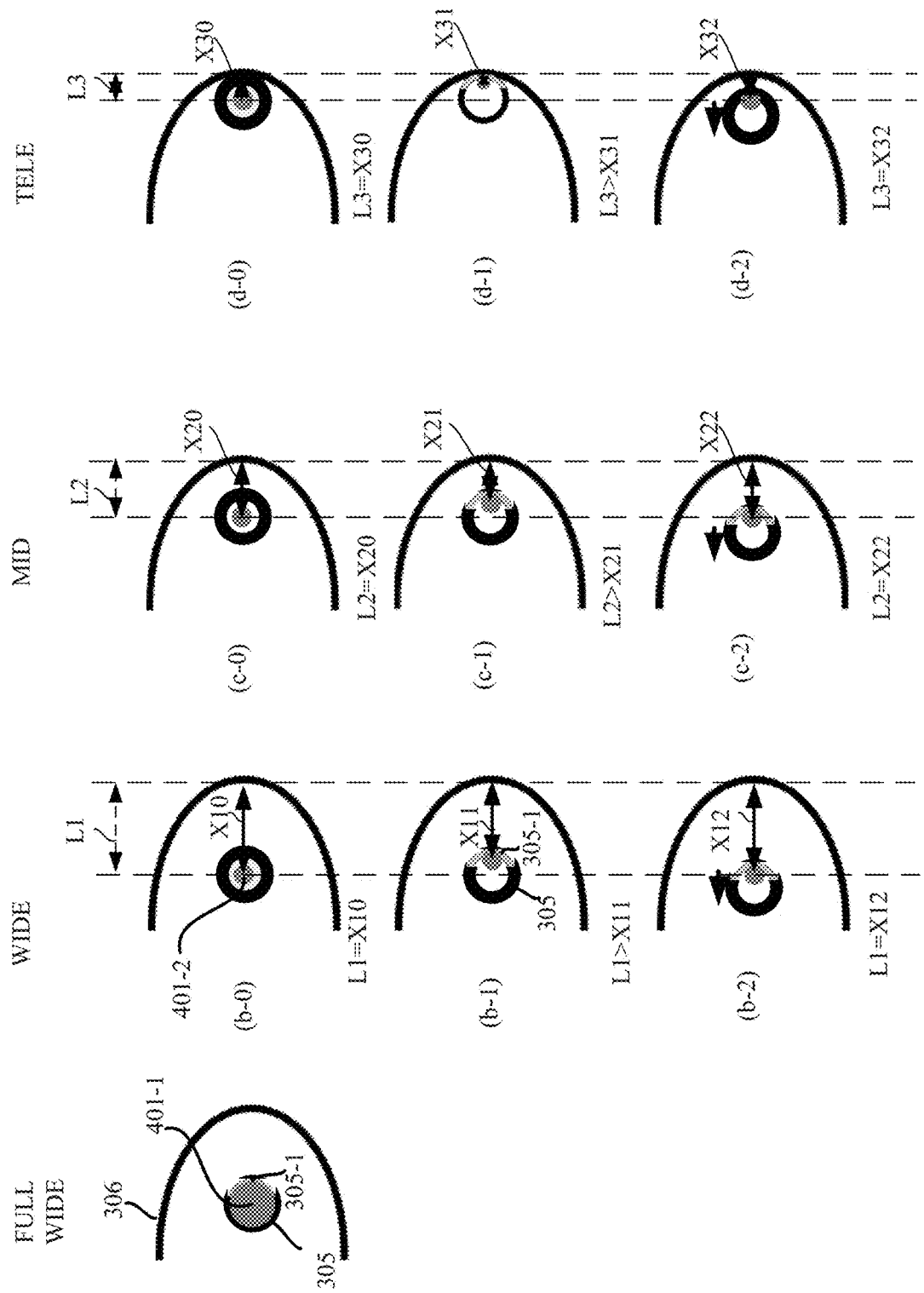

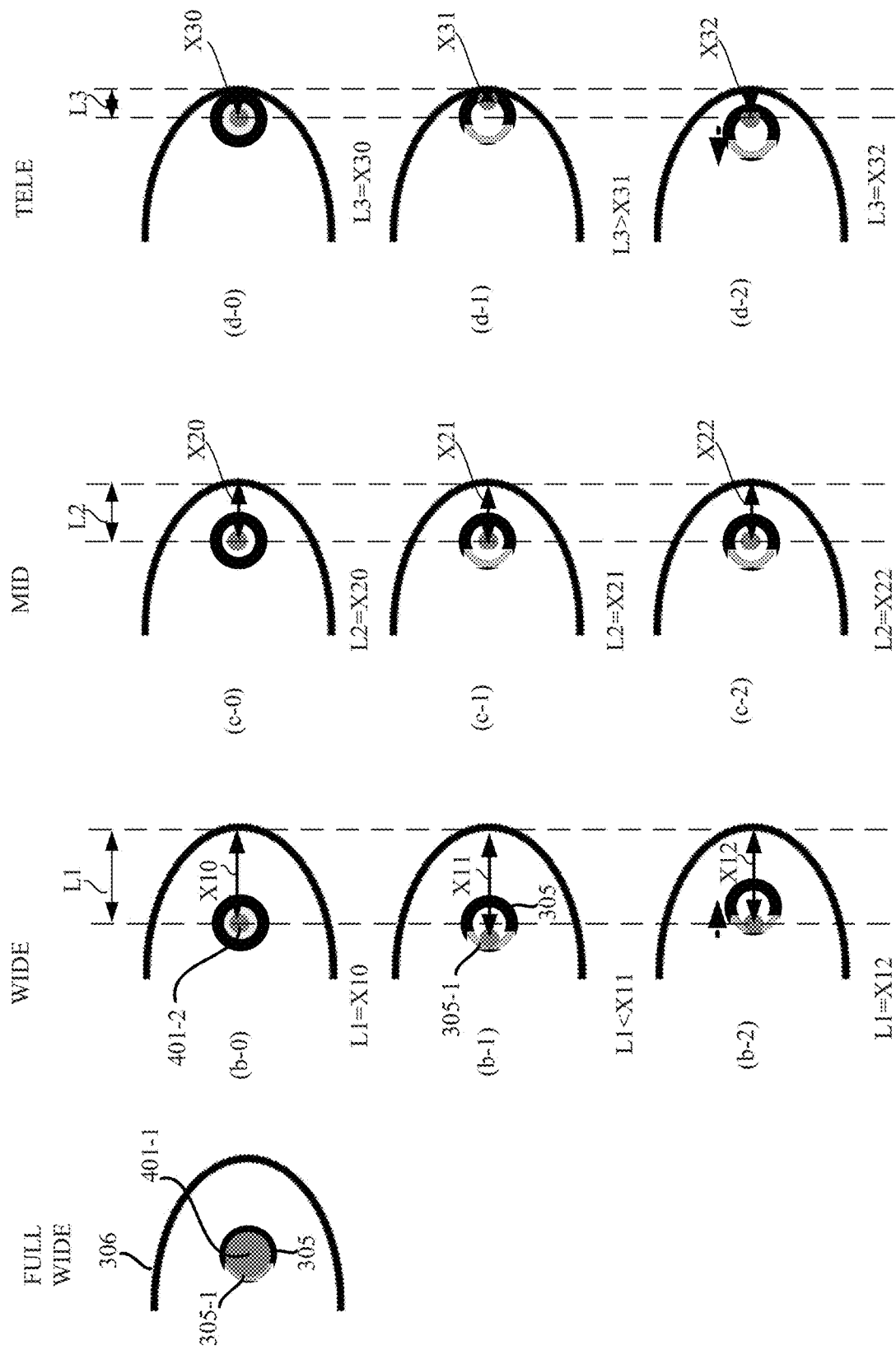

ILLUMINATION APPARATUS AND CAMERA SYSTEM HAVING THE SAME

BACKGROUND OF THE INVENTION

Field of the Invention

The present invention relates to an illumination apparatus and a camera system having the same, which can change a light distribution angle.

Description of the Related Art

A conventional zoom strobe is configured to change a light distribution angle, and one known method changes an irradiation angle by changing a discharge tube, such as a Xenon tube, a reflector, and an optical lens according to an angle of view of the lens. Japanese Patent Laid-Open No. 1-147530 discloses a strobe built-in camera that can switch an irradiation angle of the strobe light emission by changing an opening in a curved portion of a reflector as the focal length changes.

Along with the recent miniaturization of the discharge tube, a technique has been proposed which changes a light distribution angle by changing a relative position between the discharge tube and the reflector. As the relative position between the discharge tube and the reflector changes even slightly, the light distribution angle significantly changes.

FIGS. 1A to 1C are sectional views of a conventional discharge tube 1 and a conventional reflector 2, and illustrates changes of a relative position between the discharge tube 1 and the reflector 2 and a light distribution angle. FIGS. 1A, 1B, and 1C correspond to a wide-angle state, a normal state, and a telephoto state of an imaging lens, respectively. As illustrated in FIGS. 1A to 1C, a relative distance Ln (n=1, 2, 3) between the center of the discharge tube 1 and the bottom of the reflector 2 satisfies a relationship of L1>L2>L3 and a light distribution angle θn (n=1, 2, 3) satisfies a relationship of θ1>θ2>θ3.

In a full light emission, the current flowing through the discharge tube increases and the light is emitted over the inside of the discharge tube emits the light. In a weak light emission, the current flowing through the discharge tube decreases and a specific position in the discharge tube emits the light. The light distribution of the discharge tube is designed to be optimum when a luminous body is located at the center of the discharge tube 1. However, the luminous body position and the light distribution angle may change as the luminous body is attracted to the conductive reflector and/or the conductive coating applied to the discharge tube in the weak light emission.

The strobe built-in camera in JP 1-147530 is silent about the light distribution angle change in the weak light emission, and when the light distribution angle becomes an angle unintended by the user, the illumination light cannot be properly irradiated onto the object.

SUMMARY OF THE INVENTION

The present invention provides an illumination apparatus and a camera system having the same, which can illuminate an object even when a light emission amount changes and thereby a light distribution angle changes.

An illumination apparatus according to one aspect of the present invention includes a light source portion including a light emitter and a reflector configured to reflect light from the light emitter, a mover configured to move at least one of the light emitter and the reflector so that a relative distance between the light emitter and the reflector varies in order to change a light distribution angle of the light source portion, and a controller configured to control a position of at least one of the light emitter and the reflector via the mover based on a light emission amount of the light emitter.

A camera system according to another aspect of the present invention includes the above illumination apparatus, and an imaging apparatus, which the illumination apparatus is attached externally to or integral with.

Further features of the present invention will become apparent from the following description of exemplary embodiments with reference to the attached drawings.

BRIEF DESCRIPTION OF THE DRAWINGS

FIGS. 6A to 6D explain influences of a change in a relative position between the discharge tube and the reflector by the strobe zoom and a change in a light emission amount of the discharge tube, on a light distribution angle of a light source portion.

FIGS. 7A to 7D explain influences of the change in the relative position between the discharge tube and the reflector by the strobe zoom and the change in the light emission amount of the discharge tube, on the light distribution angle of the light source portion.

FIGS. 8A to 8D explain influences of the change in the relative position between the discharge tube and the reflector by the strobe zoom and the change in the light emission amount of the discharge tube, on the light distribution angle of the light source portion.

DESCRIPTION OF THE EMBODIMENTS

Figure 1A:
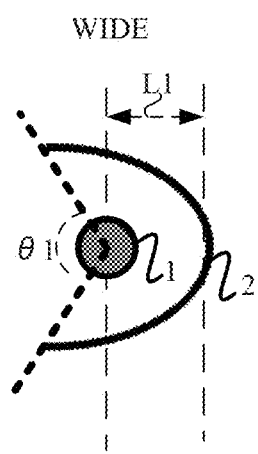
FIG. 1A to 1C illustrate changes of a relative position between a conventional reflector and a conventional discharge tube and a light distribution angle.
Figure 1B:
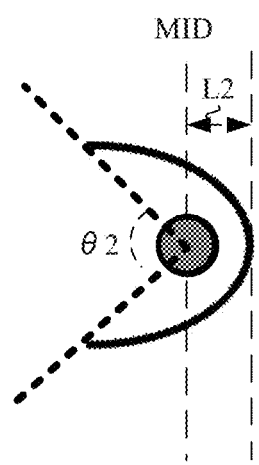
Figure 1C:
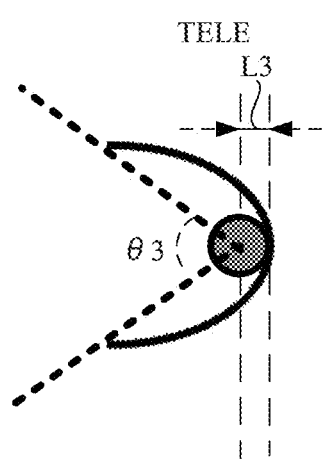

Referring now to the accompanying drawings, a detailed description will be given of embodiments according to the present invention. The same elements in each figure will be designated by the same reference numerals, and a duplicate description thereof will be omitted.

First Embodiment

Figure 2:
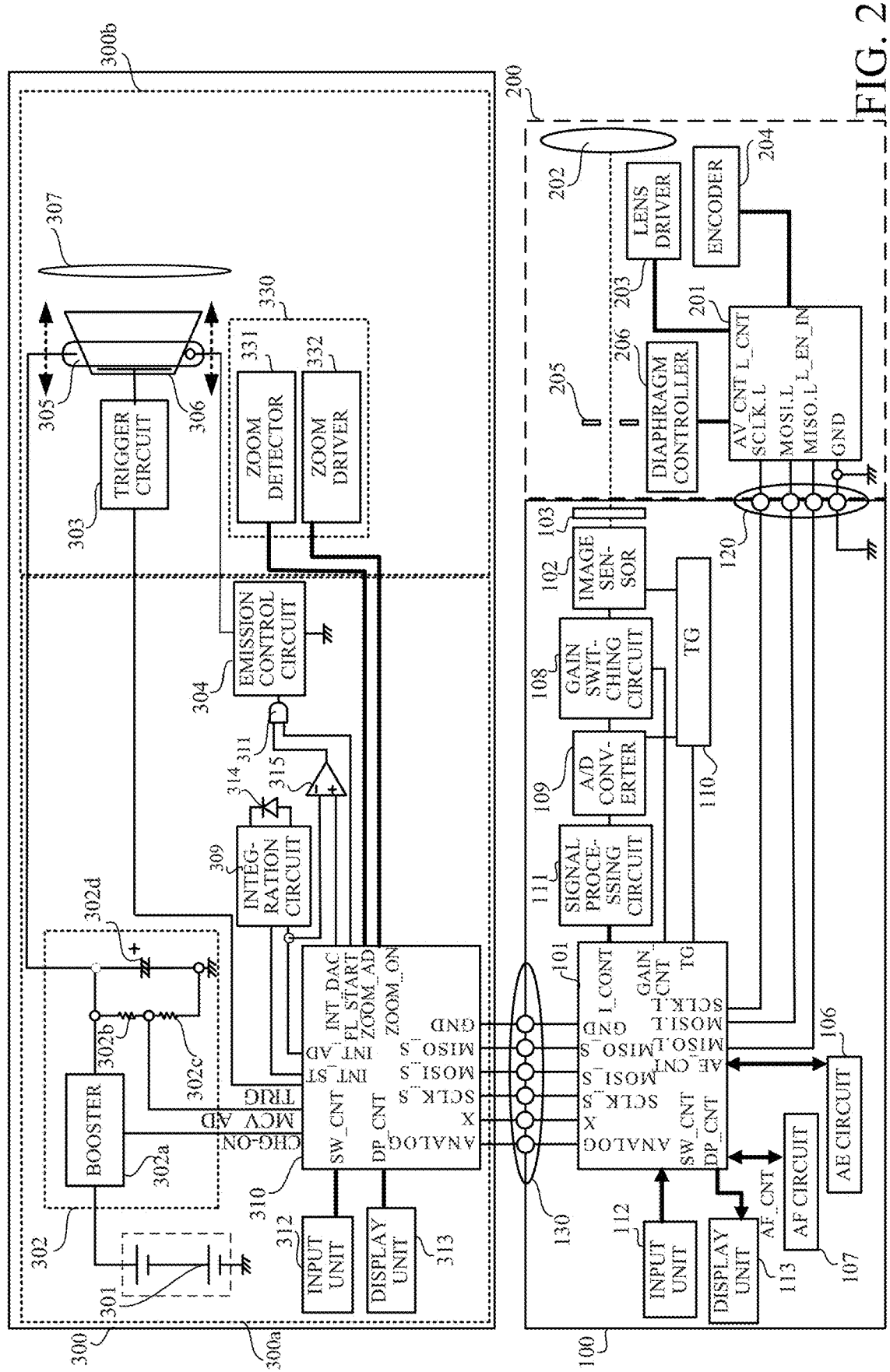
FIG. 2 schematically illustrates an electric configuration of a camera system.
Figure 3:
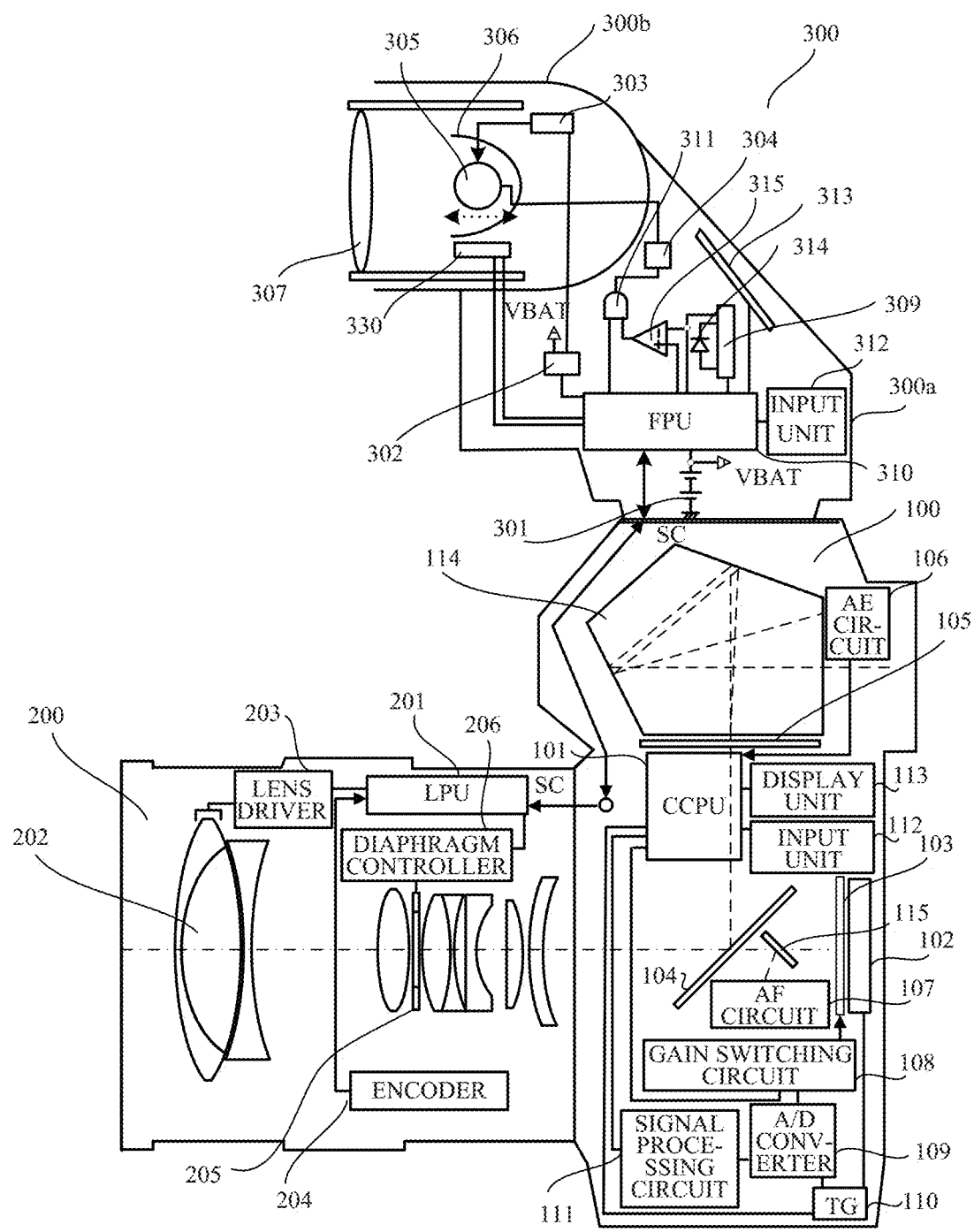
FIG. 3 schematically illustrates an optical configuration of the camera system.

FIG. 2 schematically illustrates an electrical configuration of a camera system according to this embodiment. FIG. 3 illustrates an optical configuration of the camera system. The camera system includes a camera body (imaging apparatus) 100, a lens unit 200, and an illumination apparatus 300. In this embodiment, the lens unit 200 and the illumination apparatus 300 are attached to the camera body 100 from the outside, but they may be integrated with the camera body 100.

[Configuration of Camera Body 100]

A microcomputer CPU (camera microcomputer hereinafter) 101 controls each component in the camera body 100. The camera microcomputer 101 is a microcomputer built-in one-chip IC including electronic circuits such as a CPU, a ROM, a RAM, an input/output (I/O) control circuit, a multiplexer, a timer circuit, an EEPROM, an A/D converter, and a D/A converter. The camera microcomputer 101 can control the camera system by software, and performs a variety of conditional determinations.

An image sensor 102 is an image pickup element such as a CCD or CMOS including an infrared cut filter, a low-pass filter, and the like, and a lens unit 202 forms an object image on an imaging surface of the image sensor 102 in imaging. A shutter 103 moves between a position that shields the image sensor 102 from light and a position that exposes the image sensor 102.

A main mirror 104 is a half-mirror that reflects part of the light incident from the lens unit 202 and moves between a position for forming an object image on a focus plate 105 and a position for retreating from an optical path (imaging optical path) of the light incident from the lens unit 202 to the image sensor 102. An object image formed on the focus plate 105 is confirmed by the user via an unillustrated optical viewfinder.

A light metering (or photometric) circuit (AE circuit) 106 includes a light metering (or photometric) sensor, divides the object into a plurality of regions, and meters light in each region. The light metering sensor views an object image formed on the focus plate 105 via a pentaprism 114. A focus detecting circuit (AF circuit) 107 includes a focus detecting sensor having a plurality of focus detecting points, and outputs focus information such as a defocus amount for each focus detection point.

A gain switching circuit 108 amplifies a signal output from the image sensor 102, and the camera microcomputer 101 switches the gain according to the imaging condition, the user operation, and the like. An A/D converter 109 converts an analog signal output from the image sensor 102 amplified by the gain switching circuit 108 into a digital signal. A timing generator (TG) 110 synchronizes an input of the analog signal output from the image sensor 102 amplified by the gain switching circuit 108 with the conversion timing of the A/D converter 109. A signal processing circuit 111 performs signal processing for image data converted into the digital signal by the A/D converter 109.

A communication line SC is a signal line for interfaces of the camera body 100, the lens unit 200, and the illumination apparatus 300. For example, the camera microcomputer 101 is used as a host for mutual information communications such as data exchange and command transmission. For an illustrative communication line SC, three-terminal type serial communication is performed at the terminals 120 and 130.

The terminal 120 includes an SCLK_L terminal used to synchronize the communication between the camera body 100 and the lens unit 200, a MOSI_L terminal used to transmit data to the lens unit 200, and a MISO_L terminal used to receive data transmitted from the lens unit 200. The terminal 120 also has a GND terminal connected to both the camera body 100 and the lens unit 200.

The terminal 130 is used to attach and detach the illumination apparatus 300 and a camera accessory device to and from the camera body 100, and connected to the camera microcomputer 101. The terminal 130 includes an SCLK_S terminal used to synchronize the communication between the camera body 100 and the illumination apparatus 300, a MOSI_S terminal used to transmit data from the camera body 100 to the illumination apparatus 300, and a MISO_S terminal used to receive data transmitted from the illumination apparatus 300.

Figure 4:
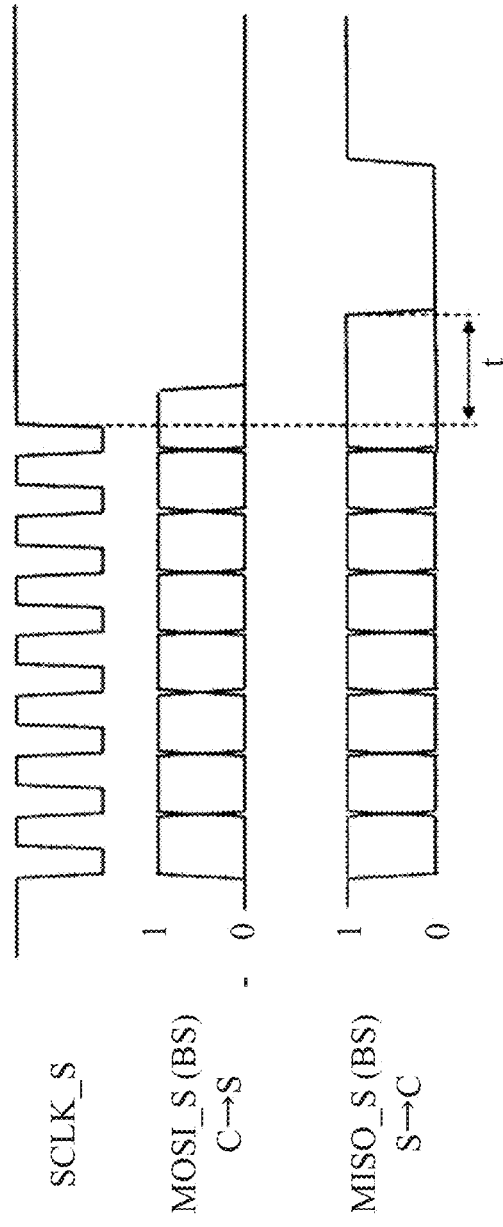
FIG. 4 illustrates an illustrative data communication via terminals of a camera body and an illumination apparatus.

FIG. 4 illustrates an illustrative data communication between the camera body 100 and the illumination apparatus 300 via the terminal 130. In transmitting data from the camera microcomputer 101 to a strobe microcomputer (controller) 310, in synchronism with an 8-bit clock of an SCLK_S terminal, data with respective bits of 0 and 1 is serially transmitted from the MOSI_S terminal. When data is transmitted from the strobe microcomputer 310 to the camera microcomputer 101, data with respective bits of 0 and 1 is serially transmitted in synchronization with the 8-bit clock of the SCLK_S terminal from the MISO_S terminal. In FIG. 4, the signal is read and written at the leading edge of the SCLK_S signal in the 8-bit (1-byte) communication, but the 8-bit communication is transmitted a plurality of times in succession with the command, the command data, and the data. Communicated information is transmitted from the camera microcomputer 101 to the strobe microcomputer 310.

An input unit 112 includes an operation unit, such as a power switch, a release switch, a setting button, and a bounce start button. The camera microcomputer 101 executes various processing according to an input to the input unit 112. When the release switch is operated by one stage (half-pressed) and SW1 is turned on, the camera microcomputer 101 starts an imaging preparing operation such as focusing and light metering. When the release switch is operated by two stages (fully pressed) and SW2 is turned on, the camera microcomputer 101 starts an imaging operation such as exposure and development processing. Operating the setting button or the like in the input unit 112 can provide a variety of settings of the illumination apparatus 300 attached to the camera body 100. A display unit 113 includes a liquid crystal device and a light emitting element, and displays a variety of set modes, other imaging information, and the like.

A pentaprism 114 guides the object image formed on the focus plate 105 to the light metering sensor in the light metering circuit 106 and an unillustrated optical viewfinder. A sub mirror 115 guides the light incident from the lens unit 202 and transmitting through the main mirror 104 to the focus detecting sensor in the focus detecting circuit 107.

[Configuration of Lens Unit 200]

A microcomputer LPU (lens microcomputer hereinafter) 201 controls each component in the lens unit 200. The lens microcomputer 201 is a microcomputer-incorporated one-chip IC including electronic circuits such as a CPU, a ROM, a RAM, an I/O control circuit, a multiplexer, a timer circuit, an EEPROM, an A/D converter, and a D/A converter.

A lens unit 202 includes a plurality of lenses including a focus lens, a zoom lens, and the like. The zoom lens may not be included in the lens unit 202. A lens driver 203 is a driving system that moves lenses included in the lens unit 202. A lens driving amount of the lens unit 202 is calculated by the camera microcomputer 101 based on an output of the focus detecting circuit 107. The calculated driving amount is transmitted from the camera microcomputer 101 to the lens microcomputer 201. An encoder 204 detects the position of the lens unit 202 and outputs driving information. The lens driver 203 moves the lens unit 202 based on the driving information from the encoder 204 for focusing. A diaphragm (aperture stop) 205 adjusts a passing light amount and is controlled by the lens microcomputer 201 via a diaphragm controller 206.

[Configuration of Illumination Apparatus 300]

The illumination apparatus 300 includes a controller 300a and a light emitter 300b. A microcomputer FPU (referred to as a strobe microcomputer hereinafter) 310 controls each component in the illumination apparatus 300. The strobe microcomputer 310 includes a microcomputer built-in one-chip IC including electronic circuits such as a CPU, a ROM, a RAM, an input/output (I/O) control circuit, a multiplexer, a timer circuit, an EEPROM, an A/D converter, and a D/A converter. The camera microcomputer 101 and the strobe microcomputer 310 have a peripheral communication function and communicate with each other via a terminal 130.

A battery 301 serves as a power supply (VBAT) of the illumination apparatus 300. A booster circuit block 302 includes a booster 302a, resistors 302b and 302c used to detect the voltage, and a main capacitor 302d. The booster circuit block 302 boosts the voltage of the battery 301 to several hundred volts by the booster 302a and causes the main capacitor 302d to charge the electric energy for the light emission.

The voltage charged by the main capacitor 302d is divided by the resistors 302b and 302c, and the divided voltage is input to the A/D conversion terminal in the strobe microcomputer 310. A trigger circuit 303 applies to a discharge tube (light emitter) 305 a pulsed voltage for exciting the discharge tube 305. An emission control circuit 304 controls the start and stop of the light emission in the discharge tube 305. The discharge tube 305 is excited by applying a pulsed voltage of several KV from the trigger circuit 303 and emits light using the electric energy charged in the main capacitor 302d. A reflector 306 is fixed, reflects the light emitted from the discharge tube 305, and guides it in a predetermined direction. In this embodiment, the discharge tube 305 and the reflector 306 constitute a light source portion.

Figure 5:
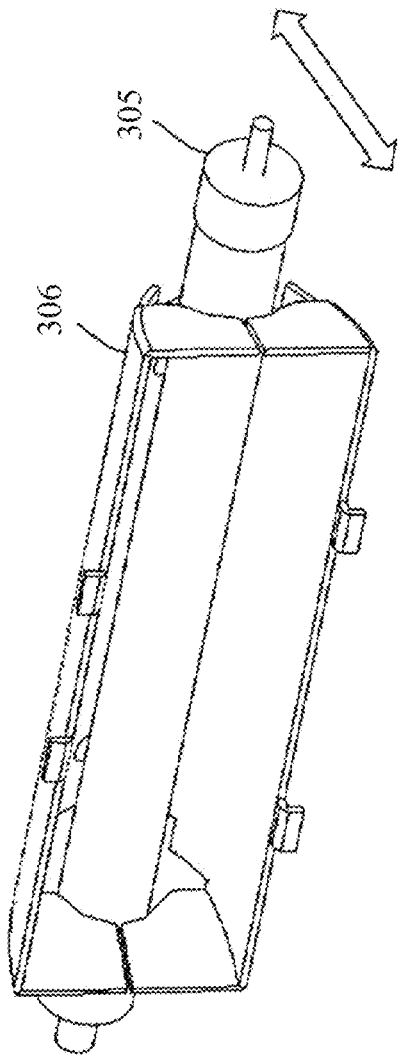
FIG. 5 illustrates a discharge tube and a reflector.

FIG. 5 illustrates the discharge tube 305 and the reflector 306. This embodiment can change the light distribution angle of the light source portion when the discharge tube 305 moves in an arrow direction (forward and backward) relative to the reflector 306. The light distribution angle widens as the discharge tube 305 moves in a direction away from the bottom of the reflector 306 (forward direction), and the light distribution angle narrows as the discharge tube 305 moves in the direction approaching the bottom (backward).

A photodiode 314 receives the light emitted from the discharge tube 305 directly or via a glass fiber or the like. An integration circuit 309 integrates the light receiving current of the photodiode 314. An output of the integration circuit 309 is input to an inverting input terminal of a comparator 315 and an A/D converter terminal of the strobe microcomputer 310. A non-inverting input terminal of the comparator 315 is connected to the D/A converter terminal in the strobe microcomputer 310, and an output of the comparator 315 is input to a first input terminal of an AND gate 311. A second input terminal in the AND gate 311 is connected to a (light) emission control terminal in the strobe microcomputer 310, and an output of the AND gate 311 is input to the emission control circuit 304.

A zoom optical system 307 includes an optical panel (such as a Fresnel lens), and is held so that a relative position between the discharge tube 305 and the reflector 306 can be changed. Changing the relative position between the reflector 306 and the zoom optical system 307 can change a guide number and an irradiation range of the illumination apparatus 300.

A zoom driving circuit (mover) 330 has a zoom detector 331 and a zoom driver 332. The zoom detector 331 detects information on the relative position between the discharge tube 305 and the reflector 306 using an encoder or the like. The zoom driver 332 includes a motor configured to move the discharge tube 305 back and forth relative to the reflector 306. A driving amount of the discharge tube 305 is calculated by the strobe microcomputer 310 based on the focal length information (zoom information) acquired via the camera microcomputer 101.

The input unit 312 includes an operation unit such as a power switch, a mode setting switch for setting an operation mode of the illumination apparatus 300, and a setting button for setting a variety of parameters. The strobe microcomputer 310 executes various processing according to an input to the input unit 312. The operation mode of the illumination apparatus 300 includes, for example, a manual mode that enables the user to freely set a light emission amount, and a preliminary emission mode that determines a light emission amount in the main emission based on the preliminary emission result. The operation mode can contain a light distribution priority emission mode and a guide number priority mode that allow the user to set a light distribution angle wider than that determined based on the light distribution angle and the focal length information. The display unit 313 includes a liquid crystal apparatus and a light emitting element, and displays the state of the illumination apparatus 300.

Figure 9A:
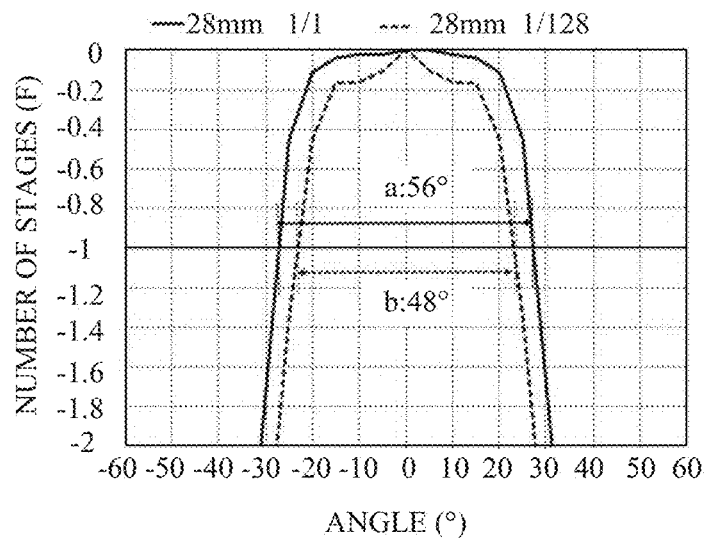
FIGS. 9A to 9C explain vertical light distribution curves of the light source portion based on the change in the relative position between the discharge tube and the reflector by the strobe zoom and the change in the light emission amount of the discharge tube.
Figure 9B:
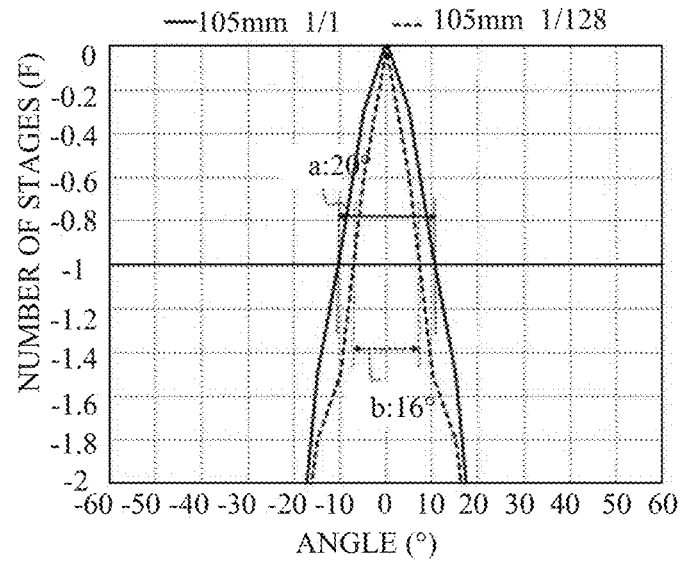
Figure 9C:
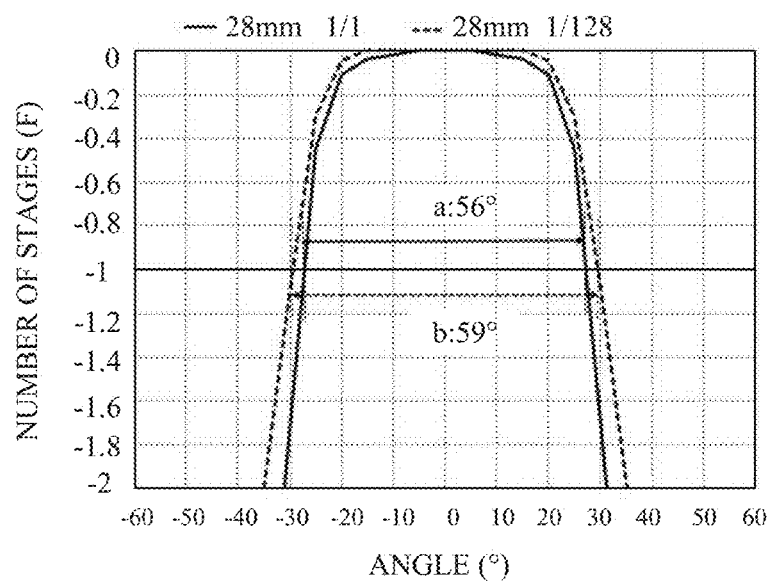

Referring now to FIGS. 6A to 9C, a description will be given of the influence of the change in the relative position between the discharge tube 305 and the reflector 306 by the strobe zoom and the change in the light emission amount of the discharge tube 305, on the light distribution angle of the light source portion. In this embodiment, the strobe zooming means changing the illumination angle of the illumination apparatus 300 by changing the light distribution angle of the light source portion. FIGS. 6A to 8D explain the influence of the change in the relative position between the discharge tube 305 and the reflector 306 by the strobe zoom and the change in the light emission amount of the discharge tube 305, on the light distribution angle of the light source portion, and are sectional views made by viewing the discharge tube 305 and the reflector 306 in the lateral direction. FIGS. 9A to 9C illustrates changes in the relative position between the reflector 306 and the discharge tube 305 by the strobe zoom and changes in the vertical light distribution of the light source portion based on the change in the light emission amount of the discharge tube 305.

In FIGS. 6A to 8D, assume that Ln (n=1, 2, 3) is the relative distance between the center of the discharge tube 305 and the bottom of the reflector 306, and Xn (n=10, 11, 12, 20, 21, 22, 30, 31, 32) is a relative distance between the center of the luminous body in the discharge tube 305 and the bottom of the reflector 306. L1 is a relative distance when the lens unit 202 is in a wide-angle state (for example, with a focal length of 28 mm) and the discharge tube 305 is located on a wide-angle side (wide position) of a normal or standard position (middle position). L2 is a relative distance when the lens unit 202 is in a normal state (for example, with a focal length of 50 mm) and the discharge tube 305 is located at the normal position. L3 is a relative distance when the lens unit 202 is in a telephoto state (for example, with a focal length of 105 mm) and the discharge tube 305 is located on the telephoto side (telephoto position) of the normal position. As illustrated, a relationship of L1>L2>L3 is satisfied.

FIG. 6A illustrates the lens unit 202 in the wide-angle state and the discharge tube 305 fully emitting light. In the full light emission, a luminous body 401-1 in the discharge tube 305 spreads over the inside of the discharge tube 305.

(b-0) in FIG. 6B illustrates an ideal position of a luminous body 401-2 in the discharge tube 305 when the lens unit 202 is in the wide-angle state and the discharge tube 305 emits weak light (such as 1/128 light emission). Since the current flowing through the discharge tube 305 decreases in the weak light emission, the luminous body 401-2 is smaller (thinner) than the luminous body 401-1 and emits the light at the center of the discharge tube 305. The relative distance L1 is the same as the relative distance X10 between the center of the luminous body 401-2 and the bottom of the reflector 306.

(b-1) in FIG. 6B illustrates an actual position of the luminous body 401-2 when the lens unit 202 is in the wide-angle state and the discharge tube 305 emits the weak light. The discharge tube 305 and the reflector 306 are sufficiently separated from each other, the luminous body 401-2 emits the light at the center of the discharge tube 305 similar to (b-0) in FIG. 6B, the relative distance L1 is the same as the relative distance X11 between the center of the luminous body 401-2 and the bottom of the reflector 306.

(c-0) in FIG. 6C illustrates the ideal position of the luminous body 401-2 when the lens unit 202 is in the normal state and the discharge tube 305 emits the weak light. The luminous body 401-2 emits the light at the center of the discharge tube 305, and the relative distance L2 is the same as the relative distance X20 between the center of the luminous body 401-2 and the bottom of the reflector 306.

(c-1) in FIG. 6C illustrates the actual position of the luminous body 401-2 when the lens unit 202 is in the normal state and the discharge tube 305 emits the weak light. The discharge tube 305 and the reflector 306 are sufficiently separated from each other, the luminous body 401-2 emits the light at the center of the discharge tube 305 similar to (c-0) in FIG. 6C, and the relative distance L2 is the relative distance X21 between the center of the luminous body 401-2 and the bottom of the reflector 306.

(d-0) in FIG. 6D illustrates the ideal position of the luminous body 401-2 when the lens unit 202 is in the telephoto state and the discharge tube 305 emits the weak light. The luminous body 401-2 emits the light at the center of the discharge tube 305, and the relative distance L3 is the same as the relative distance X30 between the center of the luminous body 401-2 and the bottom of the reflector 306.

(d-1) in FIG. 6D illustrates the actual position of the luminous body 401-2 when the lens unit 202 is in the telephoto state and the discharge tube 305 emits the weak light. Since the discharge tube 305 and the reflector 306 are close to each other, the luminous body 401-2 is attracted to the conductive reflector 306 and emits the light on the bottom side of the reflector 306 in the discharge tube 305. Then, the relative distance L3 is larger than the relative distance X31 between the center of the luminous body 401-2 and the bottom of the reflector 306. Hence, the light distribution angle is narrower than that in the case of (d-0) in FIG. 6D.

FIG. 9B illustrates vertical light distribution curves when the lens unit 202 is in the telephoto state. A solid line represents a full light emission (1/1 light emission), and a dotted line represents a weak light emission (1/128 light emission). A minus direction on the abscissa axis indicates a downward direction, a plus direction indicates an upward direction, and the ordinate axis indicates a reduction of (number of stages) of a light emission amount for the maximum light amount. The number of stages is related to an APEX value. In the weak light emission, as illustrated in (d-1) in FIG. 6D, the luminous body 401-2 emits the light on the bottom side of the reflector 306 in the discharge tube 305. When the light distribution angle is in a range between upper and lower angles in the "−1" stage, a light distribution angle a in the full light emission is 20° and a light distribution angle b in the weak light emission is 16°.

FIGS. 7A to 7D explain that a transparent conductive coating (NESA coating) 305-1 is applied to the bottom side of the reflector 306 in the discharge tube 305 so that the light emission trigger is stably applied.

FIG. 7A illustrates the lens unit 202 in the wide-angle state and the discharge tube 305 fully emitting light. In the full light emission, the luminous body 401-1 in the discharge tube 305 spreads over the inside of the discharge tube 305.

(b-0) in FIG. 7B illustrates an ideal position of the luminous body 401-2 in the discharge tube 305 when the lens unit 202 is in the wide-angle state and the discharge tube 305 emits the weak light. The luminous body 401-2 emits the light at the center of the discharge tube 305, and the relative distance L1 is the same as the relative distance X10 between the center of the luminous body 401-2 and the bottom of the reflector 306.

(b-1) in FIG. 7B illustrates the actual position of the luminous body 401-2 when the lens unit 202 is in the wide-angle state and the discharge tube 305 emits the weak light. The luminous body 401-2 is attracted to a conductive coating 305-1 and emits the light at the bottom side of the reflector 306 in the discharge tube 305. Then, the relative distance L1 is larger than the relative distance X11 between the center of the luminous body 401-2 and the bottom of the reflector 306. Therefore, the light distribution angle is narrower than that in the case of (b-0) in FIG. 7B.

(c-0) in FIG. 7C illustrates the ideal position of the luminous body 401-2 when the lens unit 202 is in the normal state and the discharge tube 305 emits the weak light. The luminous body 401-2 emits the light at the center of the discharge tube 305, and the relative distance L2 is the same as the relative distance X20 between the center of the luminous body 401-2 and the bottom of the reflector 306.

(c-1) in FIG. 7C illustrates the actual position of the luminous body 401-2 when the lens unit 202 is in the normal state and the discharge tube 305 emits the weak light. The luminous body 401-2 is attracted to the conductive coating 305-1 and emits the light at the bottom side of the reflector 306 in the discharge tube 305. Then, the relative distance L2 is larger than the relative distance X21 between the center of the luminous body 401-2 and the bottom of the reflector 306. Therefore, the light distribution angle is narrower than that in the case of (c-0) in FIG. 7C.

(d-0) in FIG. 7D illustrates the ideal position of the luminous body 401-2 when the lens unit 202 is in the telephoto state and the discharge tube 305 emits the weak light. The luminous body 401-2 emits the light at the center of the discharge tube 305, and the relative distance L3 is the same as the relative distance X30 between the center of the luminous body 401-2 and the bottom of the reflector 306.

(d-1) in FIG. 7D illustrates the actual position of the luminous body 401-2 when the lens unit 202 is in the telephoto state and the discharge tube 305 emits the weak light. The luminous body 401-2 is attracted to the conductive coating 305-1 and the reflector 306, and emits the light on the bottom side of the reflector 306 in the discharge tube 305. Then, the relative distance L3 is larger than the relative distance X31 between the center of the luminous body 401-2 and the bottom of the reflector 306. Therefore, the light distribution angle is narrower than that in the case of (d-0) in FIG. 7D.

FIG. 9A illustrates vertical light distribution curves when the lens unit 202 is in the wide-angle state. A solid line represents the full light emission (1/1 light emission), and a dotted line represents the weak light emission (1/128 light emission). A minus direction on the abscissa axis indicates a downward direction, a plus direction indicates an upward direction, and the ordinate axis indicates a reduction (number of stages) of a light emission amount from the maximum light amount. In the weak light emission, as illustrated in (b-1) in FIG. 7B, the luminous body 401-2 emits the light on the bottom side of the reflector 306 in the discharge tube 305. When the light distribution angle is in a range of upper and lower angles in the "−1" stage, the light distribution angle a in the full light emission is 56° and the light distribution angle b in the weak light emission is 48°.

FIGS. 8A to 8D explain that a transparent conductive coating (NESA coating) 305-1 is applied to the opening side of the reflector 306 in the discharge tube 305 so that the light emission trigger is stably applied.

FIG. 8A illustrates the lens unit 202 in the wide-angle state and the discharge tube 305 fully emitting the light. In the full light emission, the luminous body 401-1 in the discharge tube 305 spreads over the inside of the discharge tube 305.

(b-0) in FIG. 8B illustrates an ideal position of the luminous body 401-2 in the discharge tube 305 when the lens unit 202 is in the wide-angle state and the discharge tube 305 emits the weak light. The luminous body 401-2 emits the light at the center of the discharge tube 305, and the relative distance L1 is the same as the relative distance X10 between the center of the luminous body 401-2 and the bottom of the reflector 306.

(b-1) in FIG. 8B illustrates the actual position of the luminous body 401-2 when the lens unit 202 is in the wide-angle state and the discharge tube 305 emits the weak light. The luminous body 401-2 is attracted to the conductive coating 305-1 and emits the light on the opening side of the reflector 306 in the discharge tube 305. Then, the relative distance L1 is smaller than the relative distance X11 between the center of the luminous body 401-2 and the bottom of the reflector 306. Therefore, the light distribution angle is wider than that in the case of (b-0) in FIG. 8B.

(c-0) in FIG. 8C illustrates an ideal position of the luminous body 401-2 when the lens unit 202 is in the normal state and the discharge tube 305 emits the weak light. The luminous body 401-2 emits the light at the center of the discharge tube 305, and the relative distance L2 is the same as the relative distance X20 between the center of the luminous body 401-2 and the bottom of the reflector 306.

(c-1) in FIG. 8C illustrates the actual position of the luminous body 401-2 when the lens unit 202 is in the normal state and the discharge tube 305 emits the weak light. According to the relationship between the conductive coating 305-1 and the reflector 306, the luminous body 401-2 emits the light at the center of the discharge tube 305 similar to (c-0) in FIG. 8C, and the relative distance L2 is the same as the relative distance X21 between the center of the luminous body 401-2 and the bottom of the reflector 306.

(d-0) in FIG. 8D illustrates the ideal position of the luminous body 401-2 when the lens unit 202 is in the telephoto state and the discharge tube 305 emits the weak light. The luminous body 401-2 emits the light at the center of the discharge tube 305, and the relative distance L3 is the same as the relative distance X30 between the center of the luminous body 401-2 and the bottom of the reflector 306.

(d-1) in FIG. 8D illustrates the actual position of the luminous body 401-2 when the lens unit 202 is in the telephoto state and the discharge tube 305 emits the weak light. The luminous body 401-2 is attracted to the reflector 306 and emits the light on the bottom side of the reflector 306 in the discharge tube 305. Then, the relative distance L3 is larger than the relative distance X31 between the center of the luminous body 401-2 and the bottom of the reflector 306. Therefore, the light distribution angle is narrower than that in the case of (d-0) in FIG. 8D.

FIG. 9C illustrates vertical light distribution curves when the lens unit 202 is in the wide angle state. A solid line represents a full light emission (1/1 light emission), and a dotted line represents a weak light emission (1/128 light emission). A minus direction on the abscissa axis indicates a downward direction, a plus direction represents an upward direction, and the ordinate axis indicates a reduction (number of stages) of a light emission amount from the maximum light amount. In the weak light emission, as illustrated in (b-1) in FIG. 8B, the luminous body 401-2 emits the light on the opening side of the reflector 306 in the discharge tube 305. When the light distribution angle is in a range between upper and lower angles in the "−1" stage, the light distribution angle a in the full light emission is 56° and the light distribution angle b in the weak light emission is 59°.

The relative position between the discharge tube 305 and the reflector 306 and the light distribution angle in FIGS. 6A to 9C are merely illustrative, and the present invention is not limited to this embodiment.

The position information of the discharge tube 305 and the reflector 306 in FIGS. 6A to 9C is stored in the memory in the strobe microcomputer 310 or the memory connected to the strobe microcomputer 310.

[Operational Flow]

Figure 10A:
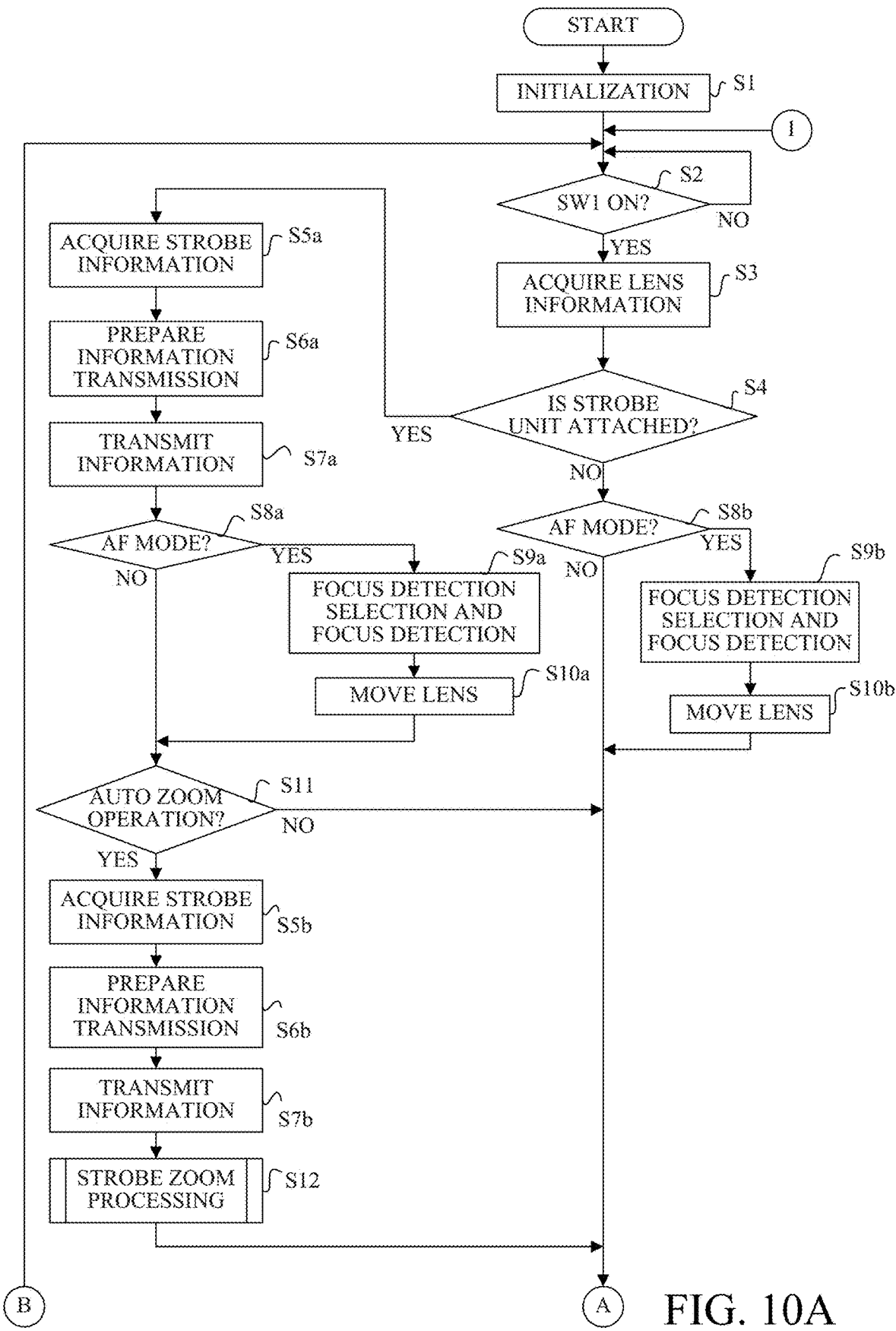
FIGS. 10A and 10B illustrate a flowchart of various processing of the camera body related to strobe zooming and imaging with the light emission.
Figure 10B:
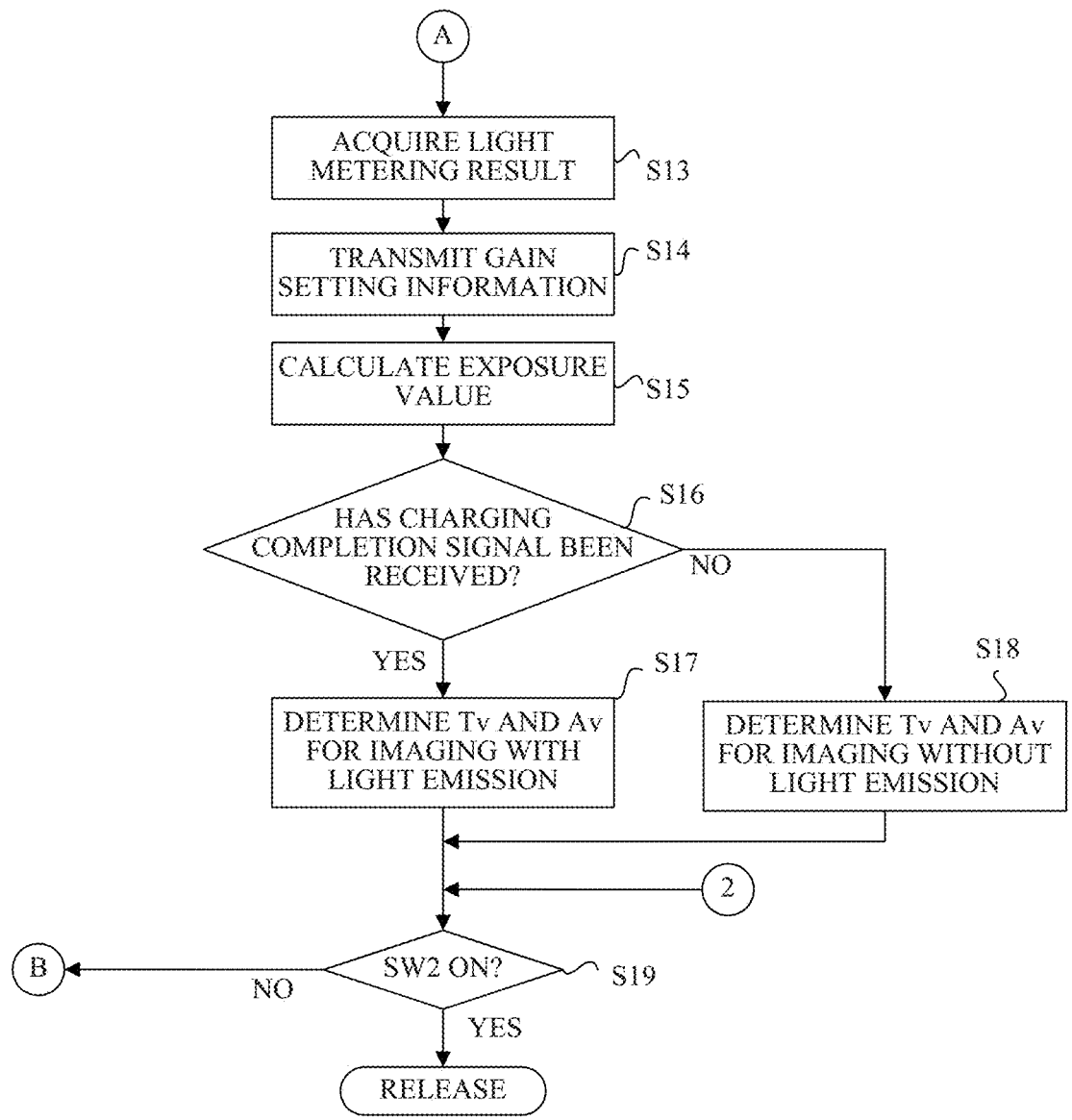
Figure 11:
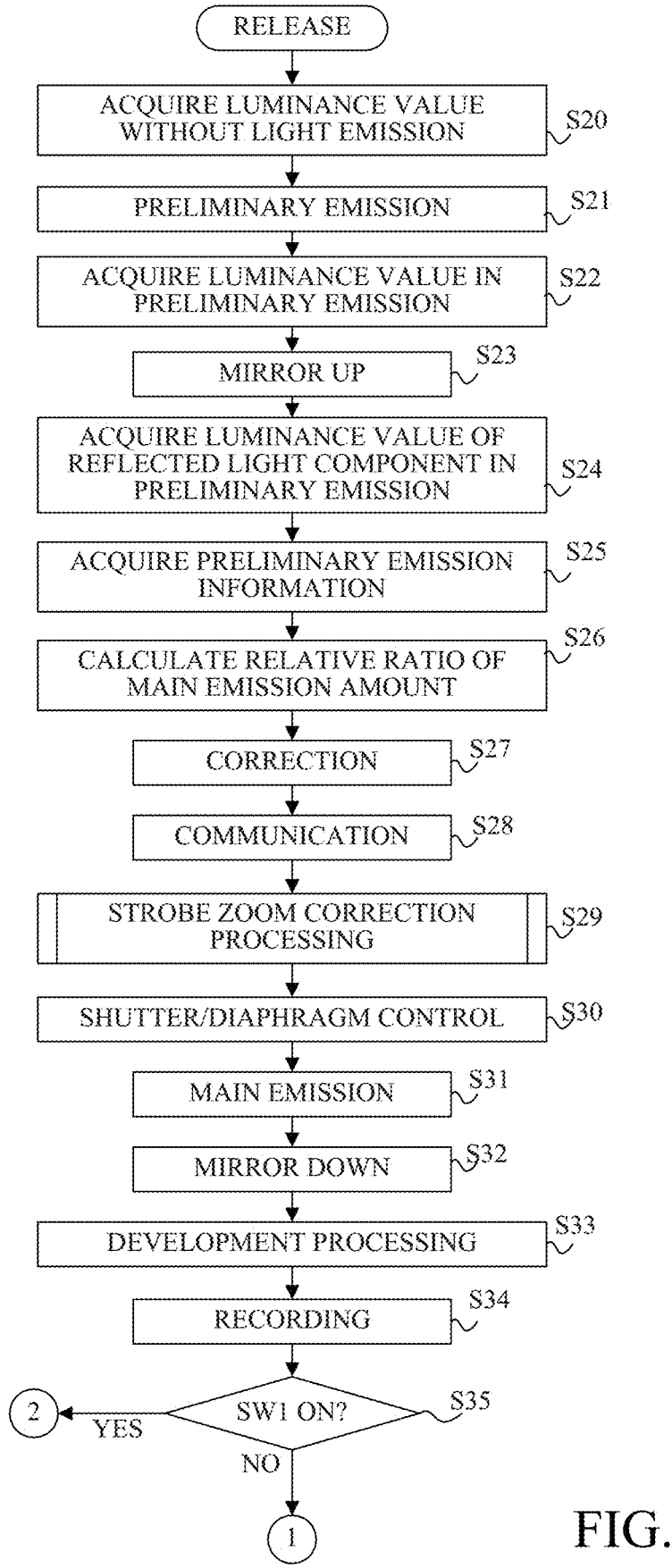
FIG. 11 is a flowchart of various processing of the camera body related to strobe zooming and imaging with the light emission.

Referring now to FIGS. 10 and 11, a description will be given of various processing in the camera body 100 to which the illumination apparatus 300 is attached. FIGS. 10 and 11 are flowcharts illustrating various processing of the camera body 100 related to the strobe zoom and the imaging with the light emission. When the power switch is turned on and the camera microcomputer 101 becomes active, the flow in FIGS. 10A and 10B starts.

In the step S1, the camera microcomputer 101 initializes its own memory and port. In addition, the camera microcomputer 101 reads the states of the switches included in the input unit 112 and preset input information, and determines the imaging condition such as a shutter speed and a diaphragm.

In the step S2, the camera microcomputer 101 determines whether the release switch is operated and SW1 is turned on. When SW1 is turned on, the flow proceeds to the step S3, and when SW1 is turned off, the step S2 is repeated.

In the step S3, the camera microcomputer 101 acquires focal length information and optical information (lens information) necessary for focusing and light metering of the lens unit 200 from the lens microcomputer 201.

In the step S4, the camera microcomputer 101 determines whether the illumination apparatus 300 is attached to the camera body 100. When the illumination apparatus 300 is mounted on the camera body 100, the flow proceeds to the step S5a, and if it is not mounted, the flow proceeds to the step S8b. The determination of attachment may be made based on whether the communication between the camera and the strobe is performed, or may be determined by a mechanical switch.

In the step S5a, the camera microcomputer 101 acquires illumination information (strobe information) such as illumination ID and charging information on the charged state of a main capacitor 302d, from the strobe microcomputer 310.

In the step S6a, the camera microcomputer 101 prepares to transmit information on the illumination apparatus 300 input via the input unit 112 to the strobe microcomputer 310. This step converts the information on the illumination apparatus 300 into the command transmission. For example, information on whether it is a device capable of executing an operation (auto zoom operation) for automatically determining an irradiation angle in imaging in accordance with a change in the focal length of the lens unit 200, and information such as settings on the camera body side and the state of the release switch are converted into the command transmission.

In the step S7a, the camera microcomputer 101 transmits information on the illumination apparatus 300 prepared in the step S6a to the illumination apparatus 300. In addition, the camera microcomputer 101 transmits the focal length information acquired in the step S3 to the strobe microcomputer 310. The strobe microcomputer 310 stores the focal length information.

In the step S8a, the camera microcomputer 101 determines whether the set focusing mode is an autofocus (AF) mode. If it is the AF mode, the flow proceeds to the step S9a, and if it is a manual focus (MF) mode, the flow proceeds to the step S11.

In the step S9a, the camera microcomputer 101 instructs the focus detecting circuit 107 to execute the focus detecting operation by the phase difference detection method. This step determines focus detecting points to be focused among a plurality of focus detecting points in accordance with an automatic selection algorithm based on the close point priority, a user's operation on the input unit 112, and the like.

In the step S10a, the camera microcomputer 101 stores the focus detecting points determined in the step S9a in the RAM in the camera microcomputer 101. The camera microcomputer 101 calculates a driving amount of the lens unit 202 based on the focus information from the focus detecting circuit 107. The camera microcomputer 101 moves the lens unit 202 via the lens microcomputer 201 based on the calculated driving amount.

In the step S11, the camera microcomputer 101 determines whether or not to execute the auto zoom operation. In executing the auto zoom operation, the flow proceeds to the step S5b, and if not, the flow proceeds to the step S13.

The processes in the steps S5b to S7b are the same as those in the steps S5a to S7a, respectively. In the step S7b, the latest focal length information is transmitted to the strobe microcomputer 310.

In the step S12, the camera microcomputer 101 executes the strobe zoom processing as described later.

The processes in the steps S8b to S10b are similar to those of the steps S8a to S10a.

In the step S13, the camera microcomputer 101 acquires the light metering result (object luminance value) by the light metering circuit 106. For example, when the light is metered in each of six divided regions in the light metering sensor in the light metering circuit 106, the camera microcomputer 101 sets the luminance value for each region as the obtained light metering result to "EVb(i) (i=0 to 5)" in the RAM.

In the step S14, the camera microcomputer 101 transmits the setting information of the gain to be switched by a gain switching circuit 108 to the strobe microcomputer 310 according to the gain setting input by the input unit 112. The gain setting is, for example, the ISO speed setting.

In the step S15, the camera microcomputer 101 calculates the exposure value (EVs) based on the light metering result (luminance value for each region stored in the RAM) acquired in the step S13.

In the step S16, the camera microcomputer 101 determines whether a charging completion signal has been received from the strobe microcomputer 310. When the charging completion signal has been received, the flow proceeds to the step S17, and if not, the flow proceeds to the step S18.

In the step S17, the camera microcomputer 101 determines an exposure control value (shutter speed (Tv) and F-number (aperture value) (Av)) suitable for the imaging with the light emission based on the exposure value calculated in the step S15.

In the step S18, the camera microcomputer 101 determines the exposure control value suitable for imaging (with no light emission) that does not cause the illumination apparatus 300 to emit the light based on the exposure value calculated in the step S15.

In the step S19, the camera microcomputer 101 determines whether the release switch is operated and SW2 is turned on. When SW2 is turned on, the flow proceeds to the step S20 in FIG. 11, and when SW2 is turned off, the flow returns to the step S2.

The processing following the step S20 relates to the imaging with the light emission and the processing relating to the imaging with no light emission omits the processing for the main emission in the processing following the step S20.

In the step S20, the camera microcomputer 101 acquires the light metering result (luminance value with no light emission) performed by the light metering circuit 106 while the illumination apparatus 300 does not emit the light. The camera microcomputer 101 stores the luminance value with no light emission for each region as the obtained light metering result as "EVa(i) (i=0 to 5)" in the RAM.

In the step S21, the camera microcomputer 101 instructs the strobe microcomputer 310 to execute a preliminary emission (pre-light emission). In accordance with this instruction, the strobe microcomputer 310 controls the trigger circuit 303 and the emission control circuit 304 to perform the preliminary emission with a predetermined light emission amount. The integration circuit 309 integrates the light receiving current of a photodiode 314 based on the light emitted from the discharge tube 305. When the integrated value of the integration circuit 309 reaches the predetermined value, the strobe microcomputer 310 stops emitting the light, but in order to maintain constant the light emission amount at this time, as will be described later, the strobe microcomputer 310 corrects the light emission amount depending on the position of the luminous body.

In the step S22, the camera microcomputer 101 acquires the light metering result (a luminance value in the preliminary emission) in the preliminary emission by the light metering circuit 106. In addition, the camera microcomputer 101 stores the luminance value in the preliminary emission for each region as the obtained light metering result as "EVf(i) (i=0 to 5)" in the RAM.

In the step S23, the camera microcomputer 101 retreats the main mirror 104 from the imaging optical path.

In the step S24, the camera microcomputer 101 calculates a luminance value (a luminance value of a reflected light component in the preliminary emission) EVdf(i) of only the reflected light component from the object in the preliminary emission using the following expression (1).

$$EVdf(i)=LN2(2^{EVf(i)}-2^{EVa\,(i)})(i=0\ \text{to}\ 5) \quad (1)$$

In the step S25, the camera microcomputer 101 acquires preliminary emission information Qpre indicating a light emission amount in the preliminary emission from the strobe microcomputer 310.

In the step S26, the camera microcomputer 101 first selects which object in the six regions should be set to as a proper light emission amount based on the focus detecting points, the focal length information, and the preliminary emission information Qpre. Next, the camera microcomputer 101 calculates a relative ratio r of a light emission amount in the main emission, which is proper to the light emission amount in the preliminary emission, based on the following expression (2) for the object in the selected region (P).

$$r=LN2(2^{EVs}-2^{EVb(p)})-EVdf(p) \quad (2)$$

A difference between the exposure value EVs and the extended object luminance value EVb is calculated so as to control the exposure when the illumination light is irradiated by adding the external light to the illumination light so that it becomes proper.

In the step S27, the camera microcomputer 101 corrects the relative ratio r using the shutter speed Tv in the imaging with the light emission, the light emission time t_pre in the preliminary emission, the correction coefficient c preset by the input unit 112, and the following expression (3), and calculates a new relative ratio r.

$$r=r+Tv-t\_pre+c \quad (3)$$

The correction is made using the shutter speed Tv and the preliminary emission time t_pre in order to correctly compare the light metering integrated value INTp in the preliminary emission and the light metering integrated value INTm in the main emission.

In the step S28, the camera microcomputer 101 transmits information on the relative ratio r for determining the light emission amount in the main emission to the strobe microcomputer 310.

In the step S29, the camera microcomputer 101 performs the following strobe zoom correction processing.

In the step S30, the camera microcomputer 101 issues a command to the lens microcomputer 201 so as to obtain the F-number determined in the step S17 or S18, and controls the shutter 103 so that it has the determined shutter speed.

In the step S31, the camera microcomputer 101 instructs the strobe microcomputer 310 to perform the main emission. The strobe microcomputer 310 performs the main emission based on the relative ratio r transmitted from the camera microcomputer 101.

In the step S32, the camera microcomputer 101 obliquely positions in the imaging optical path the main mirror 104 that has been retreated from the imaging optical path.

In the step S33, the camera microcomputer 101 executes development processing. More specifically, the camera microcomputer 101 amplifies the signal output from the image sensor 102 with the gain set by the gain switching circuit 108 and then converts it into a digital signal through the A/D converter 109. The camera microcomputer 101 then instructs the signal processing circuit 111 to perform predetermined signal processing such as white balance for the image data converted into the digital signal.

In the step S34, the camera microcomputer 101 records the image data that has undergone the signal processing in an unillustrated memory.

In the step S35, the camera microcomputer 101 determines whether the release switch is operated and SW1 is turned on. If SW1 is turned on, the flow returns to the step S19. If SW1 is turned off, the flow returns to the step S2.

[Strobe Zoom Processing]

Figure 12:
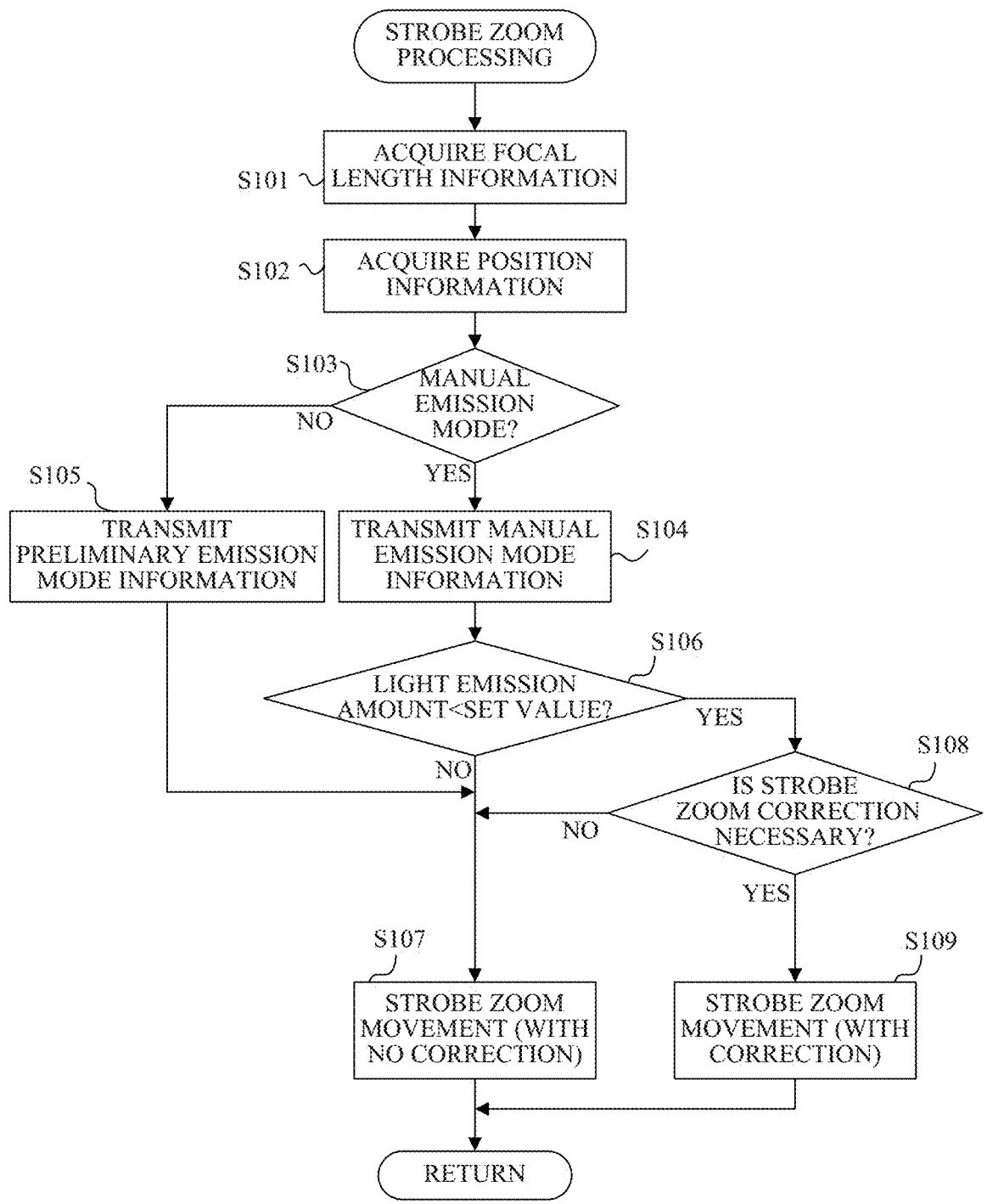
FIG. 12 is a flowchart of strobe zoom processing according to a first embodiment.

Referring now to FIG. 12, a description will be given of the strobe zoom processing. FIG. 12 is a flowchart illustrating the strobe zoom processing.

In the step S101, the strobe microcomputer 310 acquires the focal length information stored in the steps 7a and 7b.

In the step S102, the strobe microcomputer 310 acquires the position information of the discharge tube 305 and the reflector 306 that have been previously stored. The position information may be absolute position information or relative position information.

In the step S103, the strobe microcomputer 310 determines whether the manual emission mode is set which enables the user to freely set the light emission amount. When the manual emission mode is set, the flow proceeds to the step S104. When the manual emission mode is not set or the preliminary emission mode is set, the flow proceeds to the step S105.

In the step S104, the strobe microcomputer 310 transmits to the camera body 100 information indicating that the manual emission mode is set (manual emission mode information).

In the step S105, the strobe microcomputer 310 transmits to the camera body 100 information (preliminary emission mode information) indicating that the preliminary emission mode is set.

In the step S106, it is determined whether the light emission amount in the manual emission is smaller than a preset value (set value). When the light emission amount is smaller than the set value, the flow proceeds to the step S108, and when it is larger than the set value, the flow proceeds to the step S107. When the light emission amount is equal to the set value, which step to proceed may be arbitrarily set. The set value corresponds to a light emission amount in the weak light emission in which the luminous body is small (thin), and is the light emission amount at which the light distribution angle of the light source portion changes in accordance with the relative position between the discharge tube 305 and the reflector 306.

In the step S107, in order to change an irradiation range to a range suitable for the focal length, the strobe microcomputer 310 executes a zoom operation that moves the zoom optical system 307 using the driving amount calculated based on the focal length information. In this step, as illustrated in FIGS. 6A to 8D, the discharge tube 305 fully emits the light, and the illumination apparatus 300 has the optimal light distribution. Hence, the strobe zoom movement for moving the discharge tube 305 to a predetermined position is executed in accordance with the zoom operation, but the strobe zoom correction for correcting the light distribution angle is not executed by changing the position of the discharge tube 305.

In the step S108, the strobe microcomputer 310 determines whether the strobe zoom correction for correcting the light distribution angle is necessary. As described above, the light distribution angle may shift from the ideal angle depending on the relative position of the discharge tube 305 and the reflector 306, the light emission amount of the discharge tube 305, and the position of the conductive coating 305-1. For example, as illustrated in (d-1) in FIG. 6D, (b-1) in FIG. 7B to (d-1) in FIG. 7D, (b-1) in FIG. 8B, and (d-1) in FIG. 8D, when the luminous body 401-2 emits the light at a position different from the center of the discharge tube 305, the light distribution angle shifts from the ideal angle and needs to be corrected. When the strobe zoom correction is necessary, the flow proceeds to the step S109, and when the strobe zoom correction is unnecessary, the flow proceeds to the step S107.

In the step S109, the strobe microcomputer 310 executes the zoom operation. In accordance with the zoom operation, the strobe zoom movement is executed. In addition, the strobe microcomputer 310 executes the strobe zoom correction for correcting the light distribution angle by changing the position of the discharge tube 305. For example, in the state (d-1) in FIG. 6D after the zoom operation starts, the strobe microcomputer 310 moves the discharge tube 305 to the opening side of the reflector 306 so that the relative distance L3 is equal to that the relative distance X32 between the center of the luminous body 401-2 and the reflector 306 as in (d-2) in FIG. 6D. Similarly, after the zoom operation starts, in the states of (b-1) in FIG. 7B to (d-1) in FIG. 7D and (d-1) in FIG. 8D, the strobe microcomputer 310 moves the discharge tube 305 to the opening side of the reflector 306 as illustrated in (b-2) in FIG. 7B to (d-2) in FIG. 7D and (d-2) in FIG. 8D. After the zoom operation starts, in the state (b-1) in FIG. 8B, the strobe microcomputer 310 moves the discharge tube 305 to the bottom side of the reflector 306 so that the relative distance L1 is equal to the relative distance X12 between the center of the luminous body 401-2 and the bottom of the reflector 306.

[Strobe Zoom Correction Processing]

Figure 13:
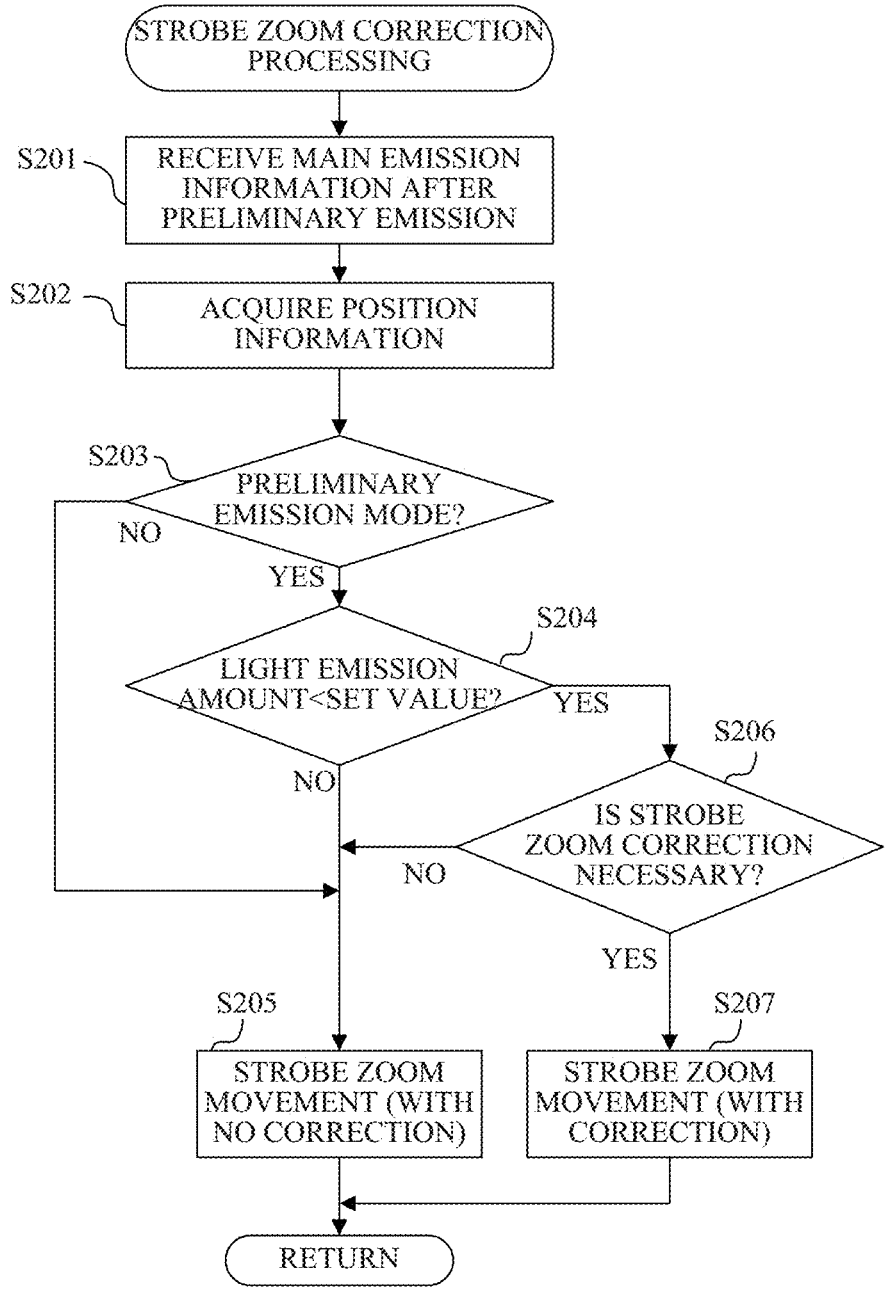
FIG. 13 is a flowchart of strobe zoom correction processing.

Referring now to FIG. 13, a description will be given of the strobe zoom correction processing. FIG. 13 is a flowchart of the strobe zoom correction processing for the light emission amount in the main emission calculated after the preliminary emission.

In the step S201, the strobe microcomputer 310 receives from the camera microcomputer 101 and stores the light emission amount information of the discharge tube 305 in the main emission calculated by the camera microcomputer 101 after the preliminary emission.

In the step S202, the strobe microcomputer 310 acquires the position information of the discharge tube 305 and the reflector 306 that have been previously stored. The position information may be absolute position information or relative position information.

In the step S203, the strobe microcomputer 310 determines whether the preliminary emission mode is set. When the preliminary emission mode is set, the flow proceeds to the step S204, and if it is not set to the preliminary emission mode, the flow proceeds to the step S205.

In the step S204, the strobe microcomputer 310 determines whether the light emission amount in the main emission received in the step S201 is smaller than a preset value (set value). When the light emission amount is smaller than the set value, the flow proceeds to the step S206, and when it is larger than the set value, the flow proceeds to the step S205. When the light emission amount is equal to the set value, which step to proceed may be arbitrarily set.

In the step S205, the strobe microcomputer 310 performs the same processing as the step S107 in FIG. 12.

In the step S206, the strobe microcomputer 310 performs the same processing as the step S108 in FIG. 12. When the strobe zoom correction is necessary, the flow proceeds to the step S207, and when the strobe zoom correction is unnecessary, the flow proceeds to the step S205.

In the step S207, the strobe microcomputer 310 performs the same processing as the step S109 in FIG. 12.

This embodiment discusses the strobe zoom processing in the auto zoom operation in the step S11 in FIGS. 10A and 10B, but the present invention is not limited to this embodiment. The correction may be performed even in the manual zoom operation, when the strobe zoom correction in the manual zoom focal length is necessary in the strobe zoom correction processing in the step S29 of FIG. 11.

Second Embodiment

Figure 14A:
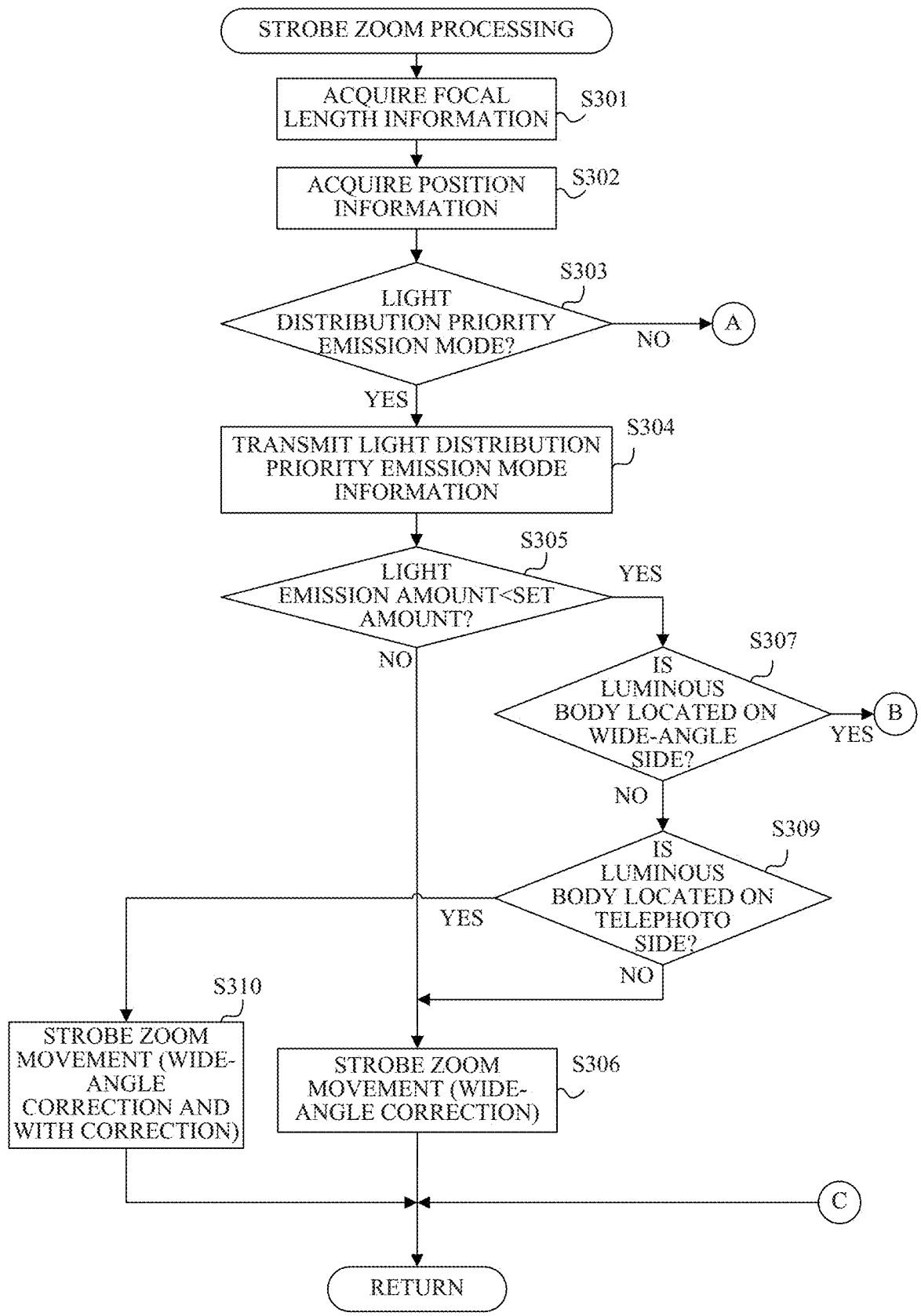
FIGS. 14A and 14B illustrate a flowchart of strobe zoom processing according to a second embodiment.
Figure 14B:
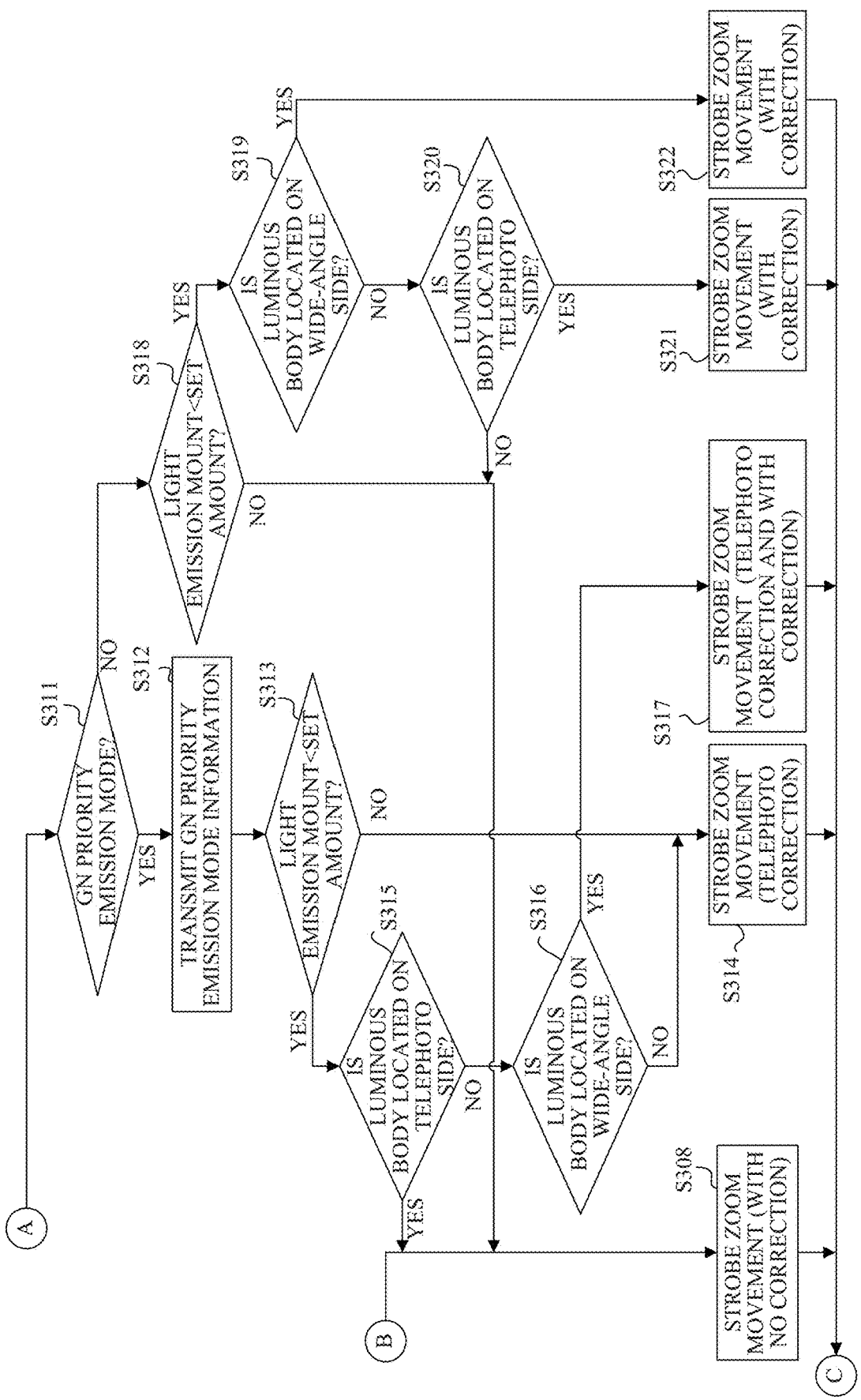

This embodiment executes the strobe zoom processing different from that of the first embodiment. The other configurations and processing are the same as those in the first embodiment and a detailed description thereof will be omitted. FIGS. 14A and 14B is a flowchart of the strobe zoom processing according to this embodiment.

In the step S301, the strobe microcomputer 310 acquires the focal length information stored in the steps 7a and 7b.

In the step S302, the strobe microcomputer 310 acquires the position information of the discharge tube 305 and the reflector 306 that have been previously stored. The position information may be absolute position information or relative position information.

In the step S303, the strobe microcomputer 310 determines whether the light distribution priority emission mode is set that allows the user to set the light distribution angle wider than that determined based on the focal length. If the light distribution priority emission mode is set, the flow proceeds to the step S304, and if the light distribution priority emission mode is not set, the flow proceeds to the step S311.

In the step S304, the strobe microcomputer 310 transmits to the camera body 100 information indicating that the light distribution priority emission mode is set (light distribution priority emission mode information).

In the step S305, the strobe microcomputer 310 determines whether the light emission amount is smaller than a preset value (set value). If the light emission amount is smaller than the set value, the flow proceeds to the step S307, and if it is larger than the set value, the flow proceeds to the step S306. When the light emission amount is equal to the set value, which step to proceed may be arbitrarily set. The processing in this step is similar to that in the step S106 in FIG. 12. The light emission amount in this step may be that in the manual emission mode in the first embodiment or that in the main emission in the preliminary emission mode.

In the step S306, the strobe microcomputer 310 (WIDE-) corrects the driving amount calculated based on the focal length information to the wide-angle side (wide side), and performs the zoom operation that moves the zoom optical system 307 based on the corrected driving amount.

In the step S307, the strobe microcomputer 310 determines whether the luminous body 401-2 is located on the wide-angle side of the center of the discharge tube 305 (opening side of the reflector 306), such as (b-1) in FIG. 8B. When the luminous body 401-2 is located on the wide-angle side, the flow proceeds to the step S308, and when it is not located on the wide-angle side, the flow proceeds to the step S309.

In the step S308, the strobe microcomputer 310 executes the zoom operation of moving the zoom optical system 307 using the driving amount calculated based on the focal length information. This step executes the strobe zoom movement for moving the discharge tube 305 to a predetermined position in accordance with the zoom operation, but does not execute the strobe zooming correction for correcting the light distribution angle by changing the position of the discharge tube 305.

In the step S309, the strobe microcomputer 310 determines whether the luminous body 401-2 is located on the telephoto side of the center of the discharge tube 305 (the bottom side of the reflector 306), such as (d-1) in FIG. 6D, (b-1) in FIG. 7B to (d-1) in FIG. 7D, and (d-1) in FIG. 8D. When the luminous body 401-2 is located on the telephoto side, the flow proceeds to the step S310, and when it is not located on the telephoto side, the flow proceeds to the step S306.

In the step S310, the strobe microcomputer 310 corrects the driving amount calculated based on the focal length information to the wide-angle side, and performs a zoom operation of moving the zoom optical system 307 based on the corrected driving amount. In addition, the strobe microcomputer 310 executes the strobe zoom correction for moving the discharge tube 305 to the opening side of the reflector 306.

In the step S311, the strobe microcomputer 310 determines whether a guide number (GN) priority emission mode is set. When the guide number priority emission mode is set, the flow proceeds to the step S312. When the guide number priority emission mode is not set, the flow proceeds to the step S318.

In the step S312, the strobe microcomputer 310 transmits to the camera body 100 information (GN priority emission mode information) indicating that the guide number priority emission mode is set.

In the step S313, the strobe microcomputer 310 determines whether the light emission amount is smaller than a preset value (set value). When the light emission amount is smaller than the set value, the flow proceeds to the step S315. When the light emission amount is larger than the set value, the flow proceeds to the step S314. When the light emission amount is equal to the set value, which step to proceed may be arbitrarily set. The processing in this step is the same as that in the step S106 in FIG. 12. The light emission amount in this step may be that in the manual emission mode in the first embodiment or that in the main emission in the preliminary emission mode.

In the step S314, the strobe microcomputer 310 (TELE-) corrects the driving amount calculated based on the focal length information to the telephoto side (telephoto side), and executes the zoom operation that moves the zoom optical system 307 based on the corrected driving amount.

In the step S315, the strobe microcomputer 310 determines whether the luminous body 401-2 is located on the telephoto side of the center of the discharge tube 305 (the bottom side of the reflector 306). If the luminous body 401-2 is located on the telephoto side, the flow proceeds to the step S308, and if it is not located on the telephoto side, the flow proceeds to the step S316.

In the step S316, the strobe microcomputer 310 determines whether the luminous body 401-2 is located on the wide-angle side of the center of the discharge tube 305 (opening side of the reflector 306). When the luminous body 401-2 is located on the wide-angle side, the flow proceeds to the step S317, and when it is not located on the wide-angle side, the flow proceeds to the step S314.

In the step S317, the strobe microcomputer 310 corrects the driving amount calculated based on the focal length information to the telephoto side, and performs the zooming operation of moving the zoom optical system 307 based on the corrected driving amount. In addition, the strobe microcomputer 310 executes the strobe zoom correction for moving the discharge tube 305 to the bottom side of the reflector 306.

In the step S318, the strobe microcomputer 310 determines whether the light emission amount is smaller than a preset value (set value). When the light emission amount is smaller than the set value, the flow proceeds to the step S319. When the light emission amount is larger than the set value, the flow proceeds to the step S308. When the light emission amount is equal to the set value, which step to proceed may be arbitrarily set. The processing in this step is the same as that in the step S106 in FIG. 12. The light emission amount in this step may be that in the manual emission mode in the first embodiment or that in the main emission in the preliminary emission mode.

In the step S319, the strobe microcomputer 310 determines whether the luminous body 401-2 is located on the wide-angle side of the center of the discharge tube 305 (opening side of the reflector 306). When the luminous body 401-2 is located on the wide-angle side, the flow proceeds to the step S322, and when it is not located on the wide-angle side, the flow proceeds to the step S320.

In the step S320, the strobe microcomputer 310 determines whether the luminous body 401-2 is located on the telephoto side of the center of the discharge tube 305 (the bottom side of the reflector 306). When the luminous body 401-2 is located on the telephoto side, the flow proceeds to the step S321, and when it is not located on the telephoto side, the flow proceeds to the step S308.

In the step S321, a zooming operation for moving the zoom optical system 307 is executed using the driving amount calculated based on the focal length information. In addition, the strobe microcomputer 310 executes the strobe zoom correction for moving the discharge tube 305 to the opening side of the reflector 306.

In the step S322, the strobe microcomputer 310 executes the zooming operation of moving the zoom optical system 307 using the driving amount calculated based on the focal length information. In addition, the strobe microcomputer 310 executes the strobe zoom correction for moving the discharge tube 305 to the bottom side of the reflector 306.

While this embodiment discusses the strobe zoom processing different from that in the first embodiment, the present invention may add the processing from the step S303 to the step S313 in FIGS. 14A and 14B between the step S203 and the step S204 even in the preliminary emission mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, the above two embodiments have discussed, as an illustrative configuration for changing the light distribution angle of the light source portion, an example that moves the discharge tube back and forth relative to the reflector, but at least one of the discharge tube and the reflector may be moved so as to change the relative distance between the discharge tube and the reflector. Such a configuration may control a movement equivalent to those of these two embodiments using a zoom driving circuit corresponding to a target to be moved.

This application claims the benefit of Japanese Patent Application No. 2018-013092, filed on Jan. 29, 2018, which is hereby incorporated by reference herein in its entirety.

What is claimed is:

1. An illumination apparatus comprising:
   a light source portion including a light emitter and a reflector configured to reflect light from the light emitter;
   a mover configured to move at least one of the light emitter and the reflector so that a relative distance between the light emitter and the reflector varies in order to change a light distribution angle of the light source portion; and
   a controller configured to control a position of at least one of the light emitter and the reflector via the mover based on a light emission amount of the light emitter.

2. The illumination apparatus according to claim 1, wherein the controller controls the position of at least one of the light emitter and the reflector via the mover based on the relative position between the light emitter and the reflector and the light emission amount of the light emitter.

3. The illumination apparatus according to claim 1, wherein the light emitter is coated with a conductive coating, and
   wherein the controller controls the position of at least one of the light emitter and the reflector via the mover based on the relative position of the conductive coating to the reflector and the light emission amount of the light emitter.

4. The illumination apparatus according to claim 1, wherein the controller controls the position of at least one of the light emitter and the reflector via the mover based on the light emission amount of the light emitter in a main emission calculated by a preliminary emission.

5. The illumination apparatus according to claim 4, wherein the controller controls, in the preliminary emission, the position of at least one of the light emitter and the reflector via the mover based on the relative position between the light emitter and the reflector and the light emission amount of the light emitter.

6. The illumination apparatus according to claim 1, wherein the controller does not change positions of the light emitter and the reflector when a light distribution angle of the light source portion widens due to a change in the light emission amount of the light emitter in a light distribution priority emission mode that prioritizes a light distribution angle of the light source portion.

7. The illumination apparatus according to claim 1, wherein the controller moves one of the mover and the reflector to a wide-angle side when a light distribution angle of the light source portion narrows due to a change in the light emission amount of the light emitter in a light distribution priority emission mode that prioritizes the light distribution angle of the light source portion.

8. The illumination apparatus according to claim 1, wherein the controller does not change positions of the light emitter and the reflector when the light distribution angle of the light source portion narrows due to a change in the light emission amount of the light emitter in a guide number priority mode that prioritizes a guide number.

9. The illumination apparatus according to claim 1, wherein the controller moves a position of at least one of the light emitter and the reflector to a telephoto side when the light distribution angle of the light source portion widens due to a change in the light emission amount of the light emitter in a guide number priority mode that prioritizes a guide number.

10. The illumination apparatus according to claim 1, wherein the illumination apparatus is detachably attached to or integral with an imaging apparatus and used to illuminate an object.

11. A camera system comprising:
    an illumination apparatus; and
    an imaging apparatus, which the illumination apparatus is detachably attached to or integral with,
    wherein the illumination apparatus includes:
    a light source portion including a light emitter and a reflector configured to reflect light from the light emitter;
    a mover configured to move at least one of the light emitter and the reflector so that a relative distance between the light emitter and the reflector varies in order to change a light distribution angle of the light source portion; and
    a controller configured to control a position of at least one of the light emitter and the reflector via the mover based on a light emission amount of the light emitter.

* * * * *